US012782822B2

(12) United States Patent
Tao et al.

(10) Patent No.: US 12,782,822 B2
(45) Date of Patent: Nov. 3, 2026

(54) METHOD FOR DETERMINING MASK PATTERN AND TRAINING MACHINE LEARNING MODEL

(71) Applicant: ASML NETHERLANDS B.V., Veldhoven (NL)

(72) Inventors: Jun Tao, Cupertino, CA (US); Yu Cao, Saratoga, CA (US); Christopher Alan Spence, Los Altos, CA (US)

(73) Assignee: ASML NETHERLANDS, Veldhoven (NL)

( * ) Notice: Subject to any disclaimer, the term of this patent is extended or adjusted under 35 U.S.C. 154(b) by 770 days.

(21) Appl. No.: 18/039,697

(22) PCT Filed: Dec. 2, 2021

(86) PCT No.: PCT/EP2021/083917

§ 371 (c)(1),
(2) Date: May 31, 2023

(87) PCT Pub. No.: WO2022/128500

PCT Pub. Date: Jun. 23, 2022

(65) Prior Publication Data

US 2024/0004305 A1 Jan. 4, 2024

Related U.S. Application Data

(60) Provisional application No. 63/127,453, filed on Dec. 18, 2020.

(51) Int. Cl.

*G03F 7/00* (2006.01)
*G03F 1/36* (2012.01)
(Continued)

(52) U.S. Cl.

CPC ............ *G03F 7/70283* (2013.01); *G03F 1/36* (2013.01); *G03F 7/70441* (2013.01);
(Continued)

(58) Field of Classification Search

None
See application file for complete search history.

(56) References Cited

U.S. PATENT DOCUMENTS 5,229,872 A 7/1993 Mumola
5,296,891 A 3/1994 Vogt et al.
(Continued)

FOREIGN PATENT DOCUMENTS

TW 200417824 9/2004
WO 2010/059954 5/2010
(Continued)

OTHER PUBLICATIONS

S. Wang et al., "Machine learning assisted SRAF placement for full chip," Photomask Technology 2017, Proc. of SPIE vol. 10451, 7 pages. (Year: 2017).*

(Continued)

*Primary Examiner* — Leigh M Garbowski
(74) *Attorney, Agent, or Firm* — Pillsbury Winthrop Shaw Pittman LLP

(57) ABSTRACT

A method for determining a mask pattern and a method for training a machine learning model. The method for generating data for a mask pattern associated with a patterning process includes obtaining (i) a first mask image (e.g., CTM) associated with a design pattern, (ii) a contour (e.g., a resist contour) based on the first mask image, (iii) a reference contour (e.g., an ideal resist contour) based on the design pattern; and (iv) a contour difference between the contour and the reference contour. The contour difference and the first mask image are inputted to a model to generate mask image modification data. Based on the first mask image and the mask image modification data, a second mask image is generated for determining a mask pattern to be employed in the patterning process.

20 Claims, 19 Drawing Sheets

(51) Int. Cl.
*G06F 30/27* (2020.01)
*G06F 30/398* (2020.01)
*G06F 119/18* (2020.01)

(52) U.S. Cl.
CPC ........ *G03F 7/705* (2013.01); *G03F 7/706841* (2023.05); *G06F 30/27* (2020.01); *G06F 30/398* (2020.01); *G06F 2119/18* (2020.01)

(56) References Cited

U.S. PATENT DOCUMENTS

| | | | | |
|---|---|---|---|---|
| 5,523,193 | A | 6/1996 | Nelson | |
| 5,969,441 | A | 10/1999 | Loopstra et al. | |
| 6,046,792 | A | 4/2000 | Van Der Werf et al. | |
| 6,058,203 | A | 5/2000 | Tsudaka | |
| 7,003,758 | B2 | 2/2006 | Ye et al. | |
| 7,587,704 | B2 | 9/2009 | Ye et al. | |
| 8,200,468 | B2 | 6/2012 | Ye et al. | |
| 8,584,056 | B2 | 11/2013 | Chen et al. | |
| 9,111,062 | B2 | 8/2015 | Chen et al. | |
| 9,588,438 | B2 | 3/2017 | Hsu et al. | |
| 11,379,647 | B2 * | 7/2022 | Ma | G03F 7/70441 |
| 2004/0130711 | A1 | 7/2004 | Van Der Werf et al. | |
| 2007/0031745 | A1 | 2/2007 | Ye et al. | |
| 2007/0050749 | A1 | 3/2007 | Ye et al. | |
| 2008/0301620 | A1 | 12/2008 | Ye et al. | |
| 2008/0309897 | A1 | 12/2008 | Wong et al. | |
| 2010/0162197 | A1 | 6/2010 | Ye et al. | |
| 2010/0180251 | A1 | 7/2010 | Ye et al. | |
| 2010/0315614 | A1 | 12/2010 | Hansen | |
| 2011/0099526 | A1 | 4/2011 | Liu | |
| 2019/0146328 | A1 * | 5/2019 | Huang | G03F 1/36 430/5 |
| 2019/0219933 | A1 * | 7/2019 | Cao | G03F 1/70 |

FOREIGN PATENT DOCUMENTS

| | | |
|---|---|---|
| WO | 2019/162346 | 8/2019 |
| WO | 2019/238372 | 12/2019 |
| WO | 2020/108902 | 6/2020 |
| WO | 2020/135988 | 7/2020 |
| WO | 2020/169303 | 8/2020 |

OTHER PUBLICATIONS

C. Spence et al., "Manufacturing Challenges for Curvilinear masks," Photomask Technology 2017, Proc. of SPIE vol. 10451, 8 pages. (Year: 2017).*

International Search Report and Written Opinion issued in corresponding International Application No. PCT/EP2021/083917, dated Mar. 25, 2022.

G. Chen et al, "DAMO: Deep Agile Mask Optimization for Full Chip Scale", ICCAD '20, pp. 1-9 (Nov. 2020).

Y. Shen et al., "Level-set-based inverse lithography for photomask synthesis", Optics Express, vol. 17, No. 26, pp. 23690-23701 (2009).

C. Spence, "Full-Chip Lithography Simulation and Design Analysis—How OPC Is Changing IC Design", Proc. SPIE, vol. 5751, pp. 1-14 (2005).

Y. Cao et al., "Optimized Hardware and Software for Fast, Full Chip Simulation", Proc. SPIE, vol. 5754, pp. 407-414 (2005).

Y. Granik, "Source Optimization for Image Fidelity and Throughput", Journal of Microlith., Microfab., Microsys., vol. 3, No. 4, pp. 509-522 (2004).

A.E. Rosenbluth et al., "Optimum Mask and Source Patterns to Print A Given Shape", Journal of Microlith., Microfab., Microsys. 1(1), pp. 13-20 (2002).

C. Spence et al., "Manufacturing Challenges for Curvilinear Masks", Proc. SPIE, vol. 10451, pp. 1-9 (2017).

R. Socha et al., "Simultaneous Source Mask Optimization (SMO)", Proc. of SPIE, vol. 5853, pp. 180-193, (2005).

* cited by examiner

METHOD FOR DETERMINING MASK PATTERN AND TRAINING MACHINE LEARNING MODEL

CROSS-REFERENCE TO RELATED APPLICATIONS

This application is the U.S. national phase entry of PCT patent application no. PCT/EP2021/083917, which was filed on Dec. 2, 2021, which claims the benefit of priority of U.S. patent application No. 63/127,453 which was filed on Dec. 18, 2020, which is incorporated herein in its entirety by reference.

TECHNICAL FIELD

The description herein relates to lithographic apparatuses and processes, and more particularly to a method for generating a mask pattern and a method for training a machine learning model associated with mask pattern generation.

BACKGROUND

A lithographic projection apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic projection apparatus, one target portion at a time. In one type of lithographic projection apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic projection apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1\times\lambda/NA$, where $\lambda$ is the wavelength of radiation employed (currently in most cases 248 nm or 193 nm), NA is the numerical aperture of projection optics in the lithographic projection apparatus, CD is the "critical dimension"-generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or design layout. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

BRIEF SUMMARY

With the advancement of lithography and other patterning process technologies, the dimensions of functional elements have continually been reduced while the amount of the functional elements, such as transistors, per device has been steadily increased over decades. In order to meet the dimensional specifications improved mask patterns, among other things, are needed to manufacture a mask to be employed in the lithography. For example, improved mask patterns may be generated using inverse lithographic simulations (e.g., optical proximity correction (OPC)), which is computational intensive and time consuming. To improve the mask pattern design time and computational time, machine learning models may be employed. Although the existing machine learning models (e.g., convolutional neural network) may be faster than conventional OPC or inverse OPC, there is still have scope for improvements and further reduce a number of iterations needed with the conventional OPC or inverse OPC algorithm to obtain a final mask pattern. In other words, outputs (e.g., mask image) of the existing OPC model may be further improved prior to performing a conventional OPC process for determining a final mask pattern.

The present disclosure addresses various problems discussed above. In an aspect, the present disclosure provides an improved method for determining mask images used to determine mask patterns to be employed in a patterning process. In another aspect, the present disclosure provided training method for generating a model configured to determine mask image modification data. The model determined in the present disclosure may be employed in existing mask pattern generation processes to further improve the quality of mask patterns and in turn improve the dimensional accuracy of printed circuits.

In an embodiment, there is provided a method for generating data for a mask pattern associated with a patterning process. The method includes obtaining input data including (i) a first mask image associated with a design pattern, (ii) a contour (e.g., polygon shapes, contour image, etc.) based on the first mask image, the contour indicative of a contour of a feature of a substrate, (iii) a reference contour (e.g., polygon shapes, reference contour image) based on the design pattern; and (iv) a contour difference between the contour and the reference contour (e.g., ideal contour that can be printed on a substrate). The first mask image and the contour difference image can be input to a model (e.g., CNN) to generate mask image modification data. In an embodiment, the mask modification data is indicative of an amount of modification of the first mask image for causing a performance parameter of the patterning process to be within a desired performance range. Based on the mask image modification data, the first mask image can be updated to generate a second mask image for determining a mask pattern to be employed in the patterning process.

In an embodiment, generation of the second mask image or the updated mask image may be an iterative processes, where the second mask image can be further updated using the model. In an embodiment, input data to the model and the output from the model may be a grey scaled images.

In an embodiment, there is provided a method for determining a model configured to generate mask image modification data associated with a patterning process. The method includes obtaining training data including (i) a first mask image based on a design pattern, (ii) a contour based on the first mask image, the contour indicative of a contour of a feature, (iii) a noise induced first mask image based on the first mask image and noise, (iv) a reference contour based on the noise induced first mask image, and (v) a contour difference based on a difference between the contour and the reference contour. The contour difference and the first mask image can be further used to determine a model configured to generate mask image modification data.

According to an embodiment, there is provided a computer program product comprising a non-transitory, computer-readable medium having instructions recorded thereon. The instructions, when executed by a computer, implement the methods listed in the claims.

BRIEF DESCRIPTION OF THE DRAWINGS

Embodiments will now be described, by way of example only, with reference to the accompanying drawings in which.

Figure 1:
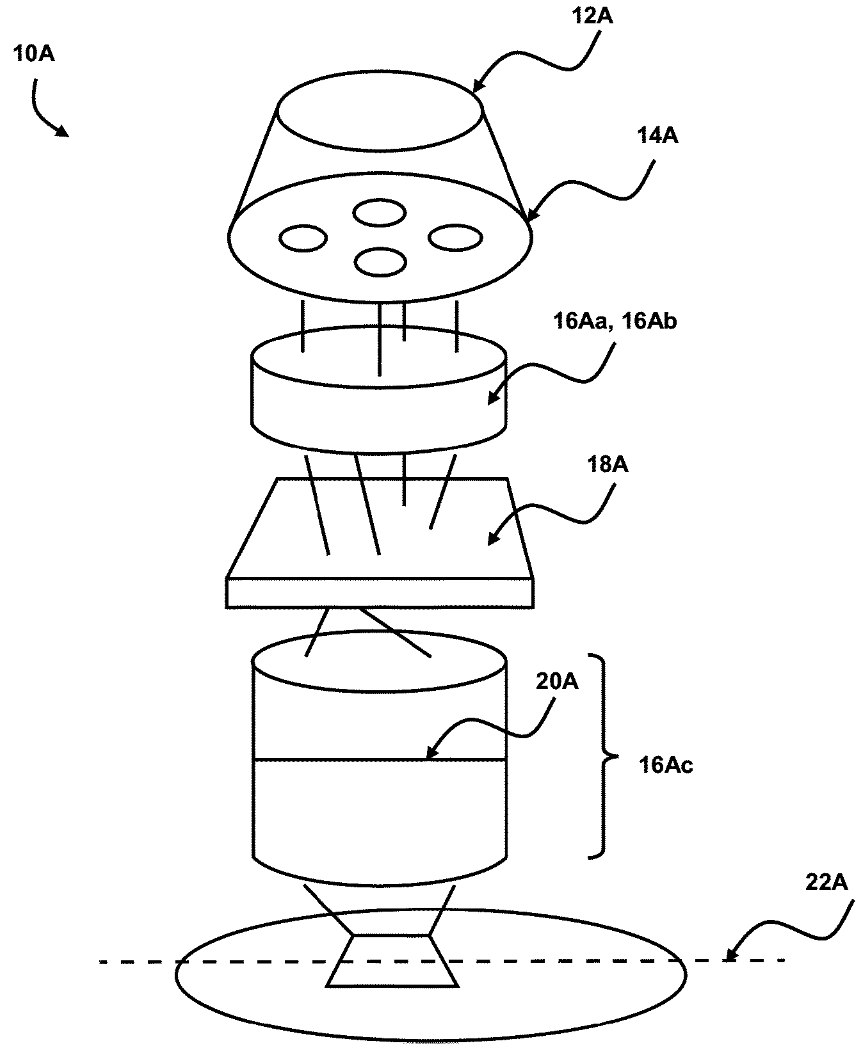
FIG. 1 is a block diagram of various subsystems of a lithography system, according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

DETAILED DESCRIPTION

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms “reticle”, “wafer” or “die” in this text should be considered as interchangeable with the more general terms “mask”, “substrate” and “target portion”, respectively.

In the present document, the terms “radiation” and “beam” are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term “optimizing” and “optimization” as used herein mean adjusting a lithographic projection apparatus such that results and/or processes of lithography have more desirable characteristics, such as higher accuracy of projection of design layouts on a substrate, larger process windows, etc.

Further, the lithographic projection apparatus may be of a type having two or more substrate tables (and/or two or more patterning device tables). In such “multiple stage” devices the additional tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above comprises or can form design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as “critical dimensions” (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term “mask” or “patterning device” as employed in this text may be broadly interpreted as referring to a generic patterning device that can be used to endow an incoming radiation beam with a patterned cross-section, corresponding to a pattern that is to be created in a target portion of the substrate; the term “light valve” can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which define the partial coherence (denoted as sigma) and which may include optics 14A, 16Aa and 16Ab that shape radiation from the source 12A; a patterning device 14A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=sin ($\Theta_{max}$).

In an optimization process of a system, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (i.e., worst deviation). The term “evaluation points” herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

In a lithographic projection apparatus, a source provides illumination (i.e. light); projection optics direct and shapes the illumination via a patterning device and onto a substrate. The term "projection optics" is broadly defined here to include any optical component that may alter the wavefront of the radiation beam. For example, projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in commonly assigned U.S. Pat. No. 8,200,468, disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the source and the projection optics.

Figure 2:
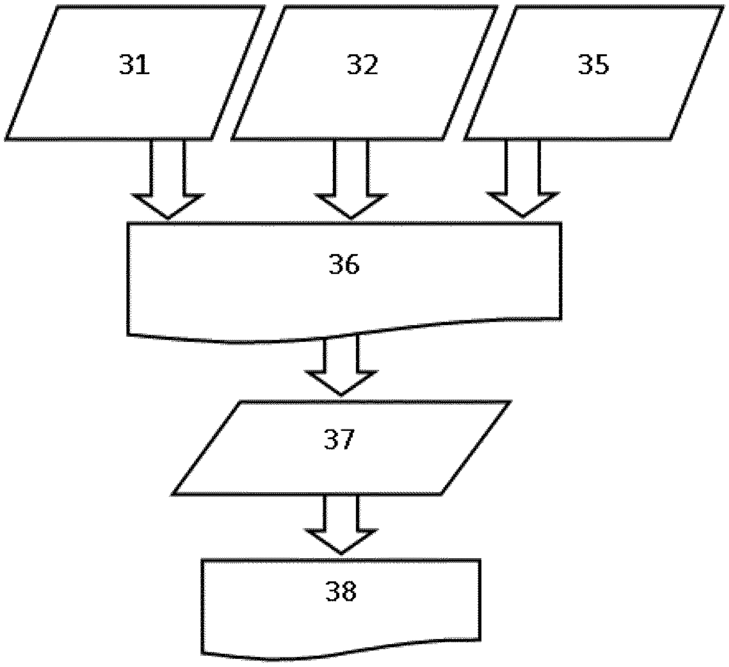
FIG. 2 is a block diagram of simulation models corresponding to the subsystems in FIG. 1, according to an embodiment.

An exemplary flow chart for simulating lithography in a lithographic projection apparatus is illustrated in FIG. 2. A source model 31 represents optical characteristics (including radiation intensity distribution and/or phase distribution) of the source. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout 33) of a design layout, which is the representation of an arrangement of features on or formed by a patterning device. An aerial image 36 can be simulated from the design layout model 35, the projection optics model 32 and the design layout model 35. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma (a) settings as well as any particular illumination source shape (e.g. off-axis radiation sources such as annular, quadrupole, and dipole, etc.). The projection optics model 32 can represent the optical characteristics of the of the projection optics that include aberration, distortion, refractive indexes, physical sizes, physical dimensions, etc. The design layout model 35 can also represent physical properties of a physical patterning device, as described, for example, in U.S. Pat. No. 7,587,704, which is incorporated by reference in its entirety. The objective of the simulation is to accurately predict, for example, edge placements, aerial image intensity slopes and CDs, which can then be compared against an intended design. The intended design is generally defined as a pre-OPC design layout which can be provided in a standardized digital file format such as GDSII or OASIS or other file format.

From this design layout, one or more portions may be identified, which are referred to as "clips". In an embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

Simulation of the patterning process can, for example, predict contours, CDs, edge placement (e.g., edge placement error), pattern shift, etc. in the aerial, resist and/or etch image. That is, the aerial image 34, the resist image 36 or the etch image 40 may be used to determine a characteristic (e.g., the existence, location, type, shape, etc. of) of a pattern. Thus, the objective of the simulation is to accurately predict, for example, edge placement, and/or contours, and/or pattern shift, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Details of techniques and models used to transform a patterning device pattern into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, 2010-0180251 and 2011-0099526, the disclosure of each which is hereby incorporated by reference in its entirety.

As lithography nodes keep shrinking, more and more complicated patterning device pattern (interchangeably referred as a mask for better readability) are required (e.g., curvilinear masks). The present method may be used in key layers with DUV scanners, EUV scanners, and/or other scanners. The method according to the present disclosure may be included in different aspect of the mask optimization process including source mask optimization (SMO), mask optimization, and/or OPC. For example, a source mask optimization process is described in U.S. Pat. No. 9,588,438 titled "Optimization Flows of Source, Mask and Projection Optics", which is hereby incorporated in its entirety by reference.

In an embodiment, a patterning device pattern is a curvilinear mask including curvilinear SRAFs having polygonal shapes, as opposed to that in Manhattan patterns having rectangular or staircase like shapes. A curvilinear mask may produce more accurate patterns on a substrate compared to a Manhattan pattern. However, the geometry of curvilinear SRAFs, their locations with respect to the target patterns, or other related parameters may create manufacturing restrictions, since such curvilinear shapes may not be feasible to manufacture. Hence, such restrictions may be considered by a designer during the mask design process. A detailed discussion on the limitation and challenges in manufacturing a curvilinear mask is provided in "Manufacturing Challenges for Curvilinear Masks" by Spence, et al., Proceeding of SPIE Volume 10451, Photomask Technology, 1045104 (16 Oct. 2017); doi: 10.1117/12.2280470, which is incorporated herein by reference in its entirety.

Optical Proximity Correction (OPC) is a photolithography enhancement technique commonly used to compensate for image errors due to diffraction and process effects. Existing model-based OPC usually consists of several steps, including: (i) derive wafer target pattern including rule retargeting, (ii) place sub-resolution assist features (SRAFs), and (iii) perform iterative corrections including model simulation (e.g., by calculating intensity map on a wafer). The most time consuming parts of the model simulation are model-based SRAF generation and cleanup based on mask rule check (MRC), and simulation of mask diffraction, optical imaging, and resist development.

One of the challenges in OPC simulation are runtime and accuracy. Usually, the more accurate the result is, the slower the OPC flow is. To get a better process window, more model simulations under different conditions (nominal condition, defocus condition, off-dose condition) are needed in each OPC iteration. Also, the more patterning process related models are included, the more iterations are needed to make the OPC result converge to the target pattern. Because of the large amount of data that needs to be processed (billions of transistors on a chip), the runtime requirement imposes severe constraints on the complexity of the OPC related algorithm. In addition, the accuracy requirements become tighter as the shrink of integrated circuits continues. As such, new algorithms and techniques are needed to address these challenges. For example, a different solution is needed, for example, for polygon-based OPC. The present disclosure provides, for example, methods for determining post-OPC layouts. The methods provide high accuracy while maintaining high speed plus the simplicity of the post-OPC layout.

In an embodiment, the curvilinear mask pattern may be obtained from a continuous transmission mask (CTM+) process (an extension of CTM process) that employs a level-set method to generate curvilinear shapes of the initial mask pattern. An example of CTM process is discussed in U.S. Pat. No. 8,584,056, mentioned earlier. In an embodiment, the CTM+ process involves steps for determining, one or more characteristics of assist features of an initial mask pattern (or a mask pattern in general) using any suitable method, based on a portion or one or more characteristics thereof. For example, the one or more characteristics of assist features may be determined using a method described in U.S. Pat. No. 9,111,062, or described Y. Shen, et al., Level-Set-Based Inverse Lithography For Photomask Synthesis, Optics Express, Vol. 17, pp. 23690-23701 (2009), the disclosures of which are hereby incorporated by reference in their entirety. For example, the one or more characteristics may include one or more geometrical characteristics (e.g., absolute location, relative location, or shape) of the assist features, one or more statistical characteristics of the assist features, or parameterization of the assist features. Examples of a statistical characteristic of the assist features may include an average or variance of a geometric dimension of the assist features.

Conventional OPC performs iterative corrections on mask polygons using a multi-variable solver or single-variable solver, by propagating the difference between simulated wafer contour and desired target contour back to a mask plane. In order to achieve a good process window, lithography simulations for multiple process window conditions (e.g., dose-focus variations) is applied to determine the mask pattern. This process takes several iterations to converge to a final mask pattern.

On the other hand, an inverse OPC typically uses a gradient-based solver. The inverse OPC process employs a cost function that is minimized. The cost function comprises edge placement errors under different process conditions. The inverse OPC process takes even more iterations to be converge than conventional OPC. The inverse OPC process the design layout in patches, and for each patch a curvilinear polygon shapes may be generated. It is challenging to merge the curvilinear shapes across patch boundaries, where each patch is processed separately with an iterative algorithm to merge the curvilinear mask shapes to generate a final mask pattern.

Deep learning based approaches may be developed to train machine learning models to speed up either conventional or inverse OPC. Typically a deep learning model (e.g., a Deep Convolutional Neural Network (DCNN)) is trained to convert a target pattern to a mask pattern. Training samples generated by a baseline OPC algorithm may be used for the training purposes. This deep learning model may not be perfect, but can provide a good approximation of a final mask pattern. The deep learning models require only a few iterations (i.e., significantly less than the conventional OPC or inverse OPC algorithm), thereby substantially speeding up the mask pattern generation process. However, additionally, a lithography simulation is used with multiple process window conditions, especially in final several iterations. A multi-variable solver of the lithography simulation is also time consuming, so it may still take significant computing time to achieve the final converged result i.e., a final mask pattern. Exemplary machine learning methods are described in PCT publication nos. WO2020169303A1, WO2019238372A1, and WO2019162346A1, all of which are incorporated in its entirety herein by reference.

Although the existing machine learning models (e.g., DCNN, CNN) may be faster than conventional OPC or inverse OPC, there is still need for improvements and further reducing a number of iterations needed with the conventional OPC or inverse OPC algorithm to obtain a final mask pattern. In other words, outputs (e.g., mask image) of the existing OPC model may be further improved prior to performing a conventional OPC process for determining a final mask pattern. For each iteration in OPC optimization process, a different OPC may cause different issue related to mask patterns, wafer target patterns, or convergence of the OPC simulation process. In the OPC simulation process, a conventional single variable solver and single condition OPC solver provide fast speed, but produce very different simulation results as iterations progresses. When a multi-condition variable solver such as in an inverse OPC simulation process, the simulation process will be substantially slow per iteration. A target adjustment method is good for both quality and speed, but training the deep CNN model used in target adjustment flow is complex. For example, for training the DCNN, additional round of inverse OPC simulation is performed on a retarget layer to prepare the training data. So it is desirable to improve the existing OPC model's accuracy to further control a number of iterations needed after applying the OPC model. In order to do so, the present disclosure describes determining another model, whose output can be used to supplement the output of the existing OPC model.

In an embodiment of the present disclosure, a reinforcement learning process may be employed to train a machine learning model (e.g., CNN, DCNN) to be used for OPC optimization, herein referred to as a second model or a second machine learning model for some embodiments. In reinforcement learning, the model is configured to learn the relationship between a contour difference (e.g., resist contour difference) and a mask image (e.g., a CTM image or CTM+ image) pixel value, and then predict what the mask image difference should be if a reference contour (e.g., a prescribed ideal resist contour) is to be achieved. For example, by using Monte Carlo search on ground truth data (e.g., CTM images), a CNN model is built. Applying this CNN model can help improve a predetermined OPC related image (e.g., a mask image used in OPC) by more than 80%, which results is substantially close to a final OPC solution. In an embodiment, a first OPC model may be an existing model employed in the OPC (as discussed above) process, and a second model that is trained according to the present disclosure may be used to improve accuracy of the first OPC model. For example, the first OPC model generates a mask image, and the second model generates improvements to the mask image such that the improved mask image when employed in OPC process generates a solution (e.g., a mask pattern) that is close to a final OPC solution (e.g., a final mask pattern).

In the training of the second model using a reinforcement learning such as Monte Carlo search on the ground truth, no additional OPC process simulation is needed for preparing the training data. In an embodiment, using the output of the second model, the first OPC model's accuracy (e.g., DCNN, CNN model accuracy) can be improved significantly. For example, by applying the second model herein once, 47% improvement in the first OPC model's accuracy can be reached. Additionally, if the second model is applied iteratively, more than 80% improvement can be reached. For example, applying the trained second model a second time, third time, etc., the first OPC model's accuracy can be improved by more than 80%. Thus, the output of the first OPC model (e.g., DCNN), when supplemented with the output of the second model described herein, gives a solution that is very close to the final OPC solution expected. For example, a final OPC solution may be gauged based on CD, EPE, LCDU or other performance parameters related to a patterning process of a substrate.

In an embodiment, the first OPC model and the second model (trained according to the present disclosure) may be referred as two separate models. For example, first OPC model may be a first CNN model and the second model may be a second CNN model. However, in an embodiment, the first model may be augmented with the second model to represent a single model. In other words, the first model and the second model may be a single model. For example, output layers of the first CNN model may be coupled with input layers of the second CNN model to generate a single CNN model. The present disclosure describes the first model and the second model separately for discussing the concepts of the present disclosure, however it does not limit the scope of the present disclosure. A person of ordinary skill in the art may train a single model according to methods described herein.

Figure 3:
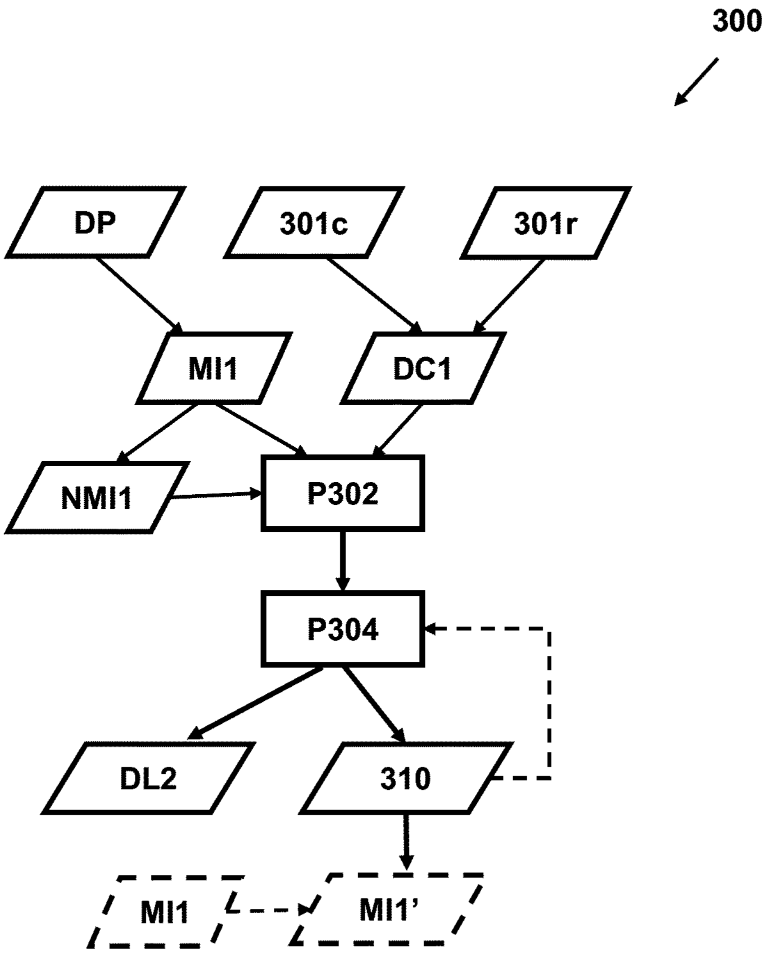
FIG. 3 is a flow chart of a method for determining a model configured to generate data for a mask pattern associated with a patterning process, according to an embodiment.

FIG. 3 is a flow chart of a method 300 for determining a model configured to generate mask image modification data based on a mask image and a contour difference, according to an embodiment. The model 300 is determined based on reinforcement learning. For example, a mask image may be perturbed by adding random noise (e.g., white noise) to generate training data for training the model to predict data for improving the mask image. The method 300 includes processes P302 for obtaining training data, and P304 for determining a model using the training data. The processes P302 and P304 are further discussed below.

In an embodiment, process P302 includes obtaining (i) a first mask image MI1 based on a design pattern DP, (ii) a contour 301*c* based on the first mask image MI1, the contour indicative of a contour of a feature, (iii) a noise induced first mask image NMI1 based on the first mask image MI1 and noise, (iv) a reference contour 301*r* based on the noise induced first mask image NMI1, and (v) a contour difference DC1 based on a difference between the contour 301*c* and the reference contour 301*r*.

In an embodiment, the design pattern DP may be data represented as an image (e.g., a pixelated image), image data (e.g. pixel location and intensity) associated with a design layout desired to be printed on a substrate, or polygon shapes in GDS format.

The present disclosure is not limited to any specific method or process of generating the first mask image MI1. In an embodiment, the first mask image MI1 may be generated based on the design pattern DP. For example, the first mask image MI1 may be generated by a machine learning model trained according to methods in PCT publication nos. WO2020169303A1, WO2019238372A1, and WO2019162346A1, all of which are incorporated herein its entirety herein by reference. In an embodiment, the mask image may be generated by free-form OPC simulation process described in U.S. Pat. Nos. 8,584,056 and 9,111,062. The first mask image MI1 may be a rectilinear pattern based image, a CTM or CTM+ image. In an embodiment, the first mask image MI1 is grey scaled post optical proximity correction (OPC) images.

In an embodiment, the post-OPC image can be data represented as an image (e.g., a pixelated image) or image data (e.g. pixel location and intensity). In an embodiment, the post-OPC image includes pattern data e.g., a main feature data and assist feature data. A main feature refers to a feature corresponding to a design feature of the design layout, within a post-OPC pattern. In an embodiment, the main feature data and assist feature data can be separate. In an embodiment, the main feature data and the assist feature data can be represented as two different images or in combined form e.g., as a single image.

In an embodiment, obtaining of the post-OPC image involves obtaining data related to geometric shapes (e.g., polygon shapes or non-polygon shapes, such as square, rectangle, rounded polygons, or circular shapes, etc.) of main features corresponding to design features of the design layout. Similarly, geometric shapes of assist features may also be obtained. For example, image processing (e.g., edge detection) of the post-OPC image may be performed for extracting the geometric shapes of the design layout, or a post-OPC image.

In an embodiment, the contour 301*c* may be generated based on the first mask image MIL. In an embodiment, obtaining the contour 301*c* involves executing a patterning process model using the first mask image MI1 as input to generate a simulated image; extracting, using a contour extraction algorithm, a contour from the simulated image;

and converting the contour 301*c* to generate the contour image. In an embodiment, the contour includes geometric shape information that may be extracted by image processing employing as an edge detection algorithm.

In an embodiment, the contour 301*c* may be represented as polygon shapes (e.g., in GDS format), an image or other data formats. In an embodiment, the contour 301*c* may be converted to a contour image indicative of a contour of a feature. In an embodiment, the contour 301*c* may be associated with an after development process, after etch process (e.g., a resist process, etching process, etc.), or other process associated with patterning a wafer substrate. Accordingly, the contour image may referred as a resist image or an etch image. In an embodiment, the after development process may be a resist process, an etching process, or other processes. For example, the contour 301 is generated by applying an after-development inspection (ADI) model on the first mask image. Accordingly, the contour 301*c* may be a resist contour, or an etch contour. It can be understood that the resist contour and etch contour are only exemplary and does not limit the scope of the present disclosure. The present disclosure is not limited to contours associated a particular process or the type of the substrate. For example, in an embodiment, the substrate may be a mask substrate used to manufacture a hard mask. Accordingly, the contour may refer to contours associated with the mask substrate on which mask related patterning processes are performed.

In an embodiment, a rasterization operation may be performed on the geometric shapes data to generate an image representation. For example, the rasterization operation converts the geometric shapes (e.g. in vector graphics format) to a pixelated image. In an embodiment, the rasterization may further involve applying a low-pass filter to clearly identify feature shapes and reduce noise.

In an embodiment, the noise induced first mask image NMI1 may be generated using the first mask image MI1 and noise. For example, the induced noise may be white noise characterized by discrete signals that are uncorrelated random variables with zero mean and finite variance. In an embodiment, the noise may be induced at portions corresponding to main features in the first mask image MI1.

In an embodiment, the reference contour 301*r* may be determined from the noise induced first mask image NMI1. In an embodiment, obtaining the reference contour 301*r* includes generating and adding a random noise image to the first mask image MI1. The obtaining of the reference contour 301*r* includes extracting, using a contour extraction algorithm, a contour from the noise induced first mask image NMI1; and converting the contour to generate the reference contour image. For example, the contour can be converted to a contour image by applying a rasterization operation, as discussed above.

In an embodiment, the contour difference DC1 is determined by using a difference between the contour 301*c* and the reference contour 301*r*. As mentioned earlier, the first image, the contour image, the reference contour image, and the mask image modification data may be grey scale pixelated images. Accordingly, the contour difference DC1 may be a grey scale pixelated image.

Figure 4:
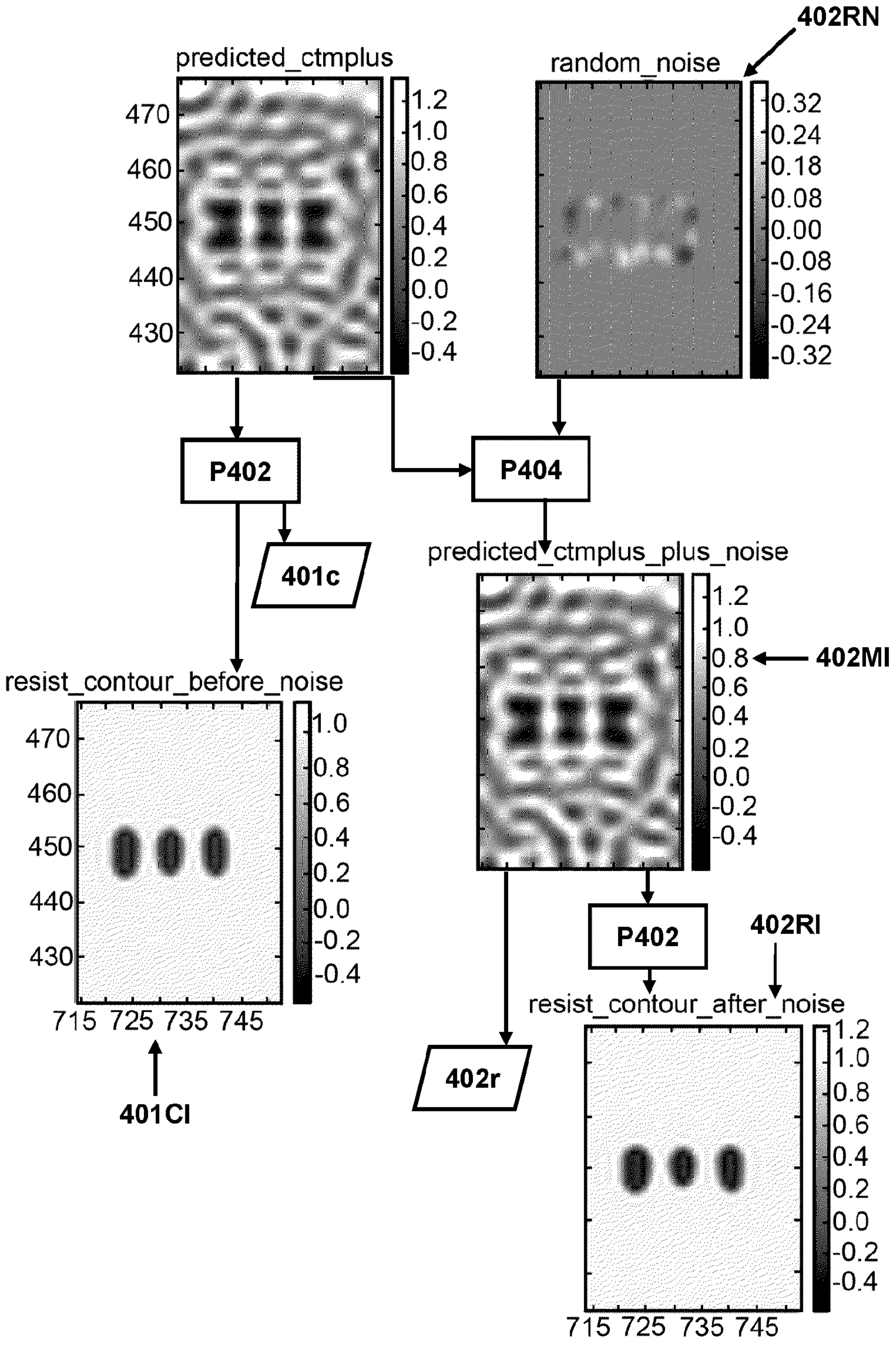
FIG. 4 illustrates exemplary processes of generating exemplary training data for determining a model, according to an embodiment.
Figure 5:
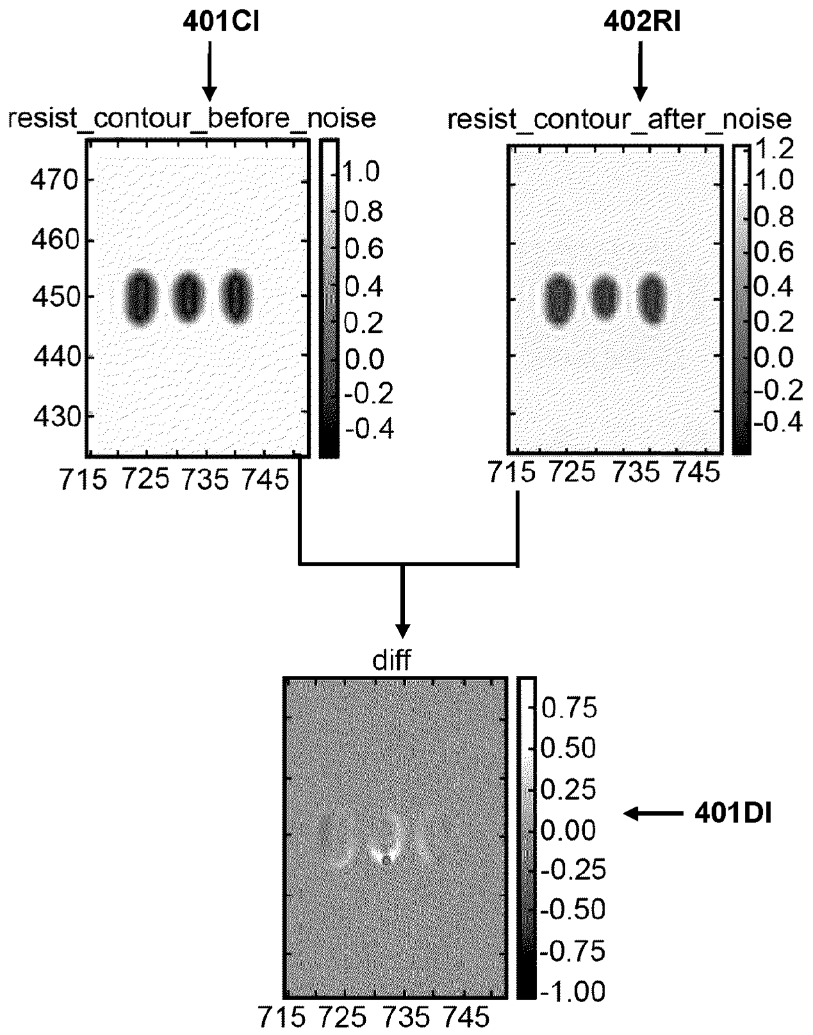
FIG. 5 illustrates another exemplary training data used for determining a model, according to an embodiment.

FIGS. 4 and 5 show exemplary training data, represented as images for illustration purposes. The present disclosure is not limited to image representation, and other appropriate acceptable data formats (e.g., vector, table, etc.) associated with a model being trained may be used. In FIG. 5, a mask image 401MI may be obtained by simulating process models according to FIGS. 10-14, an OPC process such as conventional OPC or a Freeform OPC employing CTM, or CTM+ mask generation flow.

In the present example, the mask image 401MI is obtained from a CTM+ flow (e.g., employing a level-set method) using a design pattern. The mask image 401MI includes portions representative of main features (e.g., dark portions such as portion MF1) corresponding to features of the design pattern and assist feature portions (e.g., relatively less dark portions such as portion AF1) surrounding the main features (e.g., MF1). The mask image 401MI is pixelated a grey scale image, each pixel having an intensity value. For example, main feature portions (e.g., MF1) of the mask image 401MI have higher pixel intensities compared to assist feature portions (e.g., AF1). Typically, from the mask image, one or more main features and assist features may be extracted to design a mask pattern corresponding to the design pattern. More accurate a mask image, more accurate will be the patterned substrate.

In an embodiment, the mask image 401MI may be inputted to a contour extraction process P402 to extract contours 401*c* from the mask image 401MI. The present disclosure is not limited to any specific method of mechanism of obtaining the contours from the mask image. The contours can be mask image contours directly corresponding to the mask image, or resist contours of resist images that are derived from the mask image or any other suitable types of feature contours. For example, the contour extraction process P402 extracts contours 401*c* corresponding to main features. In an example, the contour extraction process P402 may employ a pixel intensity thresholding method to identify and extract contours corresponding to main features. In another example, the contour extraction process P402 may employ a machine learning model configured to generate contours from a mask image. In yet another example, the contour includes geometric shape information that may be extracted by image processing employing as an edge detection algorithm. The present disclosure is not limited to a particular contour extraction method. In another example, determining the contour 401*c* involves extracting contour/polygon from the mask image 401MI by using a specified threshold. The polygon/contour may include both main features and assistant features. Applying a process simulation model (e.g. resist model) using the polygon/contour, and get a simulated image (e.g., a resist image). From the resist image, the contour 401*c* may be extracted. Similarly, the reference contour 402*r* can be obtained using the noise induced mask image.

In an embodiment, the contours 401*c* may be polygon shapes, curvilinear shapes, or rectilinear outlines. In an embodiment, the contours 401*c* may be further converted to an image by applying a rasterization operation. For example, the contour 401*c* including contours corresponding to main features (e.g., MF1 of the mask image) may be converted to a contour image 401CI. The contour image 401CI may be a pixelated grey scale image having higher pixel intensity values corresponding to the main features (e.g., MF1 of the mask image). In an embodiment, the contour 401*c* may be included in training data. Alternatively or additionally, the contour image 401CI may be included in the training data.

In an embodiment, the mask image 401MI may be modified to generate reference contour data to be included in the training data. In an embodiment, the mask image 401MI may be modified using a noise image 402RN. The noise image 402RN may be a white noise, where the pixel intensity values are uncorrelated to each other or randomly assigned. In an embodiment, the noise image 402RN may be include white noise only at portions corresponding to main feature portions (e.g., MF1) of the mask pattern 401MI. In an embodiment, a process P404 combines the mask image 401MI with the noise image 402RN to generate a noise induced mask image 402MI. The noise induced mask image 402MI may be inputted to the process P402 (discussed above) to extract reference contour 402*r*.

In an embodiment, the reference contour 402*r* may be converted to a reference contour image 402RI by applying a rasterization operation to the reference contour 402*r*. In an embodiment, the reference contour 402*r* may be included in the training data. Alternatively or in addition, the reference contour image 402RI may be included in the training data. By incorporating the induced noise, such reference contour can account for stochastic variations that may be present in the mask image. As such, a model trained using the reference contour may be more robust to stochastic variation thereby generating more reliable and accurate mask patterns.

Referring to FIG. 5, a difference contour (not illustrated) may be generated based on a difference between the contour 401*c* and the reference contour 402*r*. In an embodiment, a difference contour image 401DI may be generated by using a difference between pixel intensities of the contour image 401CI and the reference contour image 402RI. In an embodiment, the difference contour may be included in the training data. Additionally or alternatively, the difference contour image 401DI may be included in the training data. As shown, the difference contour image 401DI includes different pixel intensity values (e.g., at ring like shapes) corresponding to the main features portions where noise was induced.

Referring back to FIG. 3, process P304 includes determining, based on the contour difference DC1 and the first mask image MI1, a model DL2 configured to generate mask image modification data 310, for example which can be used for updating mask image (e.g., MI1') in an OPC optimization process. In an embodiment, the model DL2 is determined by adjusting model parameters so that the mask image modification data is within a specified threshold of the noise induced in the first mask image MIL. In an embodiment, the model DL2 configured to generate the mask image modification data may a machine learning model. For example, the machine learning model is a CNN, DCNN, or other neural network.

In an embodiment, training the model DL2 is an iterative process. Each iteration may include executing, using the contour difference DC1 and the first mask image MI1 as input, the model DL2 having initial model parameter values to generate an initial mask image modification data. The initial mask image modification data may be compared with the noise. The comparison may indicate how closely the mask image modification data matches the noise. Based on the comparison, the initial model parameter values may be adjusted to cause the mask image modification data to be within a specified matching threshold of the noise. For example, the matching threshold may be more than 95%.

In an embodiment, the adjusting of the model parameter values may be based on a gradient descent method, or other methods related to machine learning. For example, a performance of the model DL2 may be determined via a performance function (e.g., a difference between model output and a reference). Further, in gradient decent method, a gradient of the performance may be computed with respect to the model parameters. The gradient can be used as a guide to improve the performance of the model DL2 causing the model DL2 to progressively generate improved mask image modification data that matches the noise.

Figure 6:
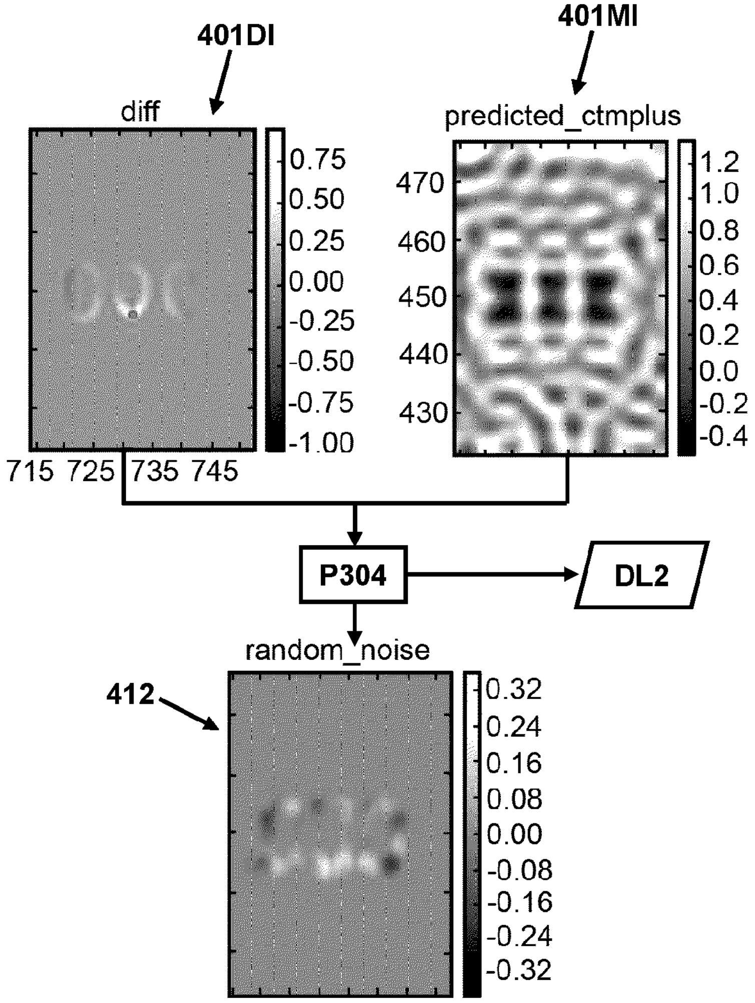
FIG. 6 illustrates exemplary process of determining a model using the training data of FIGS. 4 and 5, according to an embodiment.

FIG. 6 illustrates exemplary training of the model using the training data of FIGS. 4 and 5, discussed herein. Referring to FIG. 6, the mask image 401MI and the difference contour image 401DI of the training data acts as input to a model being trained and the noise image 402RN may serve as a reference against which an output 412 of the model can be compared. Based on the comparison, it can be determined how closely the model output 412 matches the noise image 402RN in order to determine a performance of the model being trained. For example, if the model output 412 is within a desired matching threshold (e.g., more than 95%) of the reference contour image 402RN, then the model is considered as a trained model DL2. In an embodiment, the model DL2 can be further used to generate mask image modification data to generate improved mask images.

In an embodiment, the trained model DL2 may be employed to generate the mask image modification data and an updated mask image. For example, the method 300 further includes obtaining a mask image and a reference contour based on a design pattern DP; executing the model DL2 using the mask image and the contour difference to generate mask image modification data; and updating the mask image by combining the mask image modification data with the mask image.

In an embodiment, updating the mask image is an iterative process including steps (i) updating the contour difference based on the updated mask image; (ii) executing the model using the updated mask image and the updated contour difference to generate mask image modification data; (iii) combining the mask image modification data with the updated mask image; (iv) determining based the updated mask image whether a performance parameter is within a specified performance threshold; and (v) responsive to the performance parameter not satisfying the performance threshold, performing steps (i)-(iv).

Figure 7:
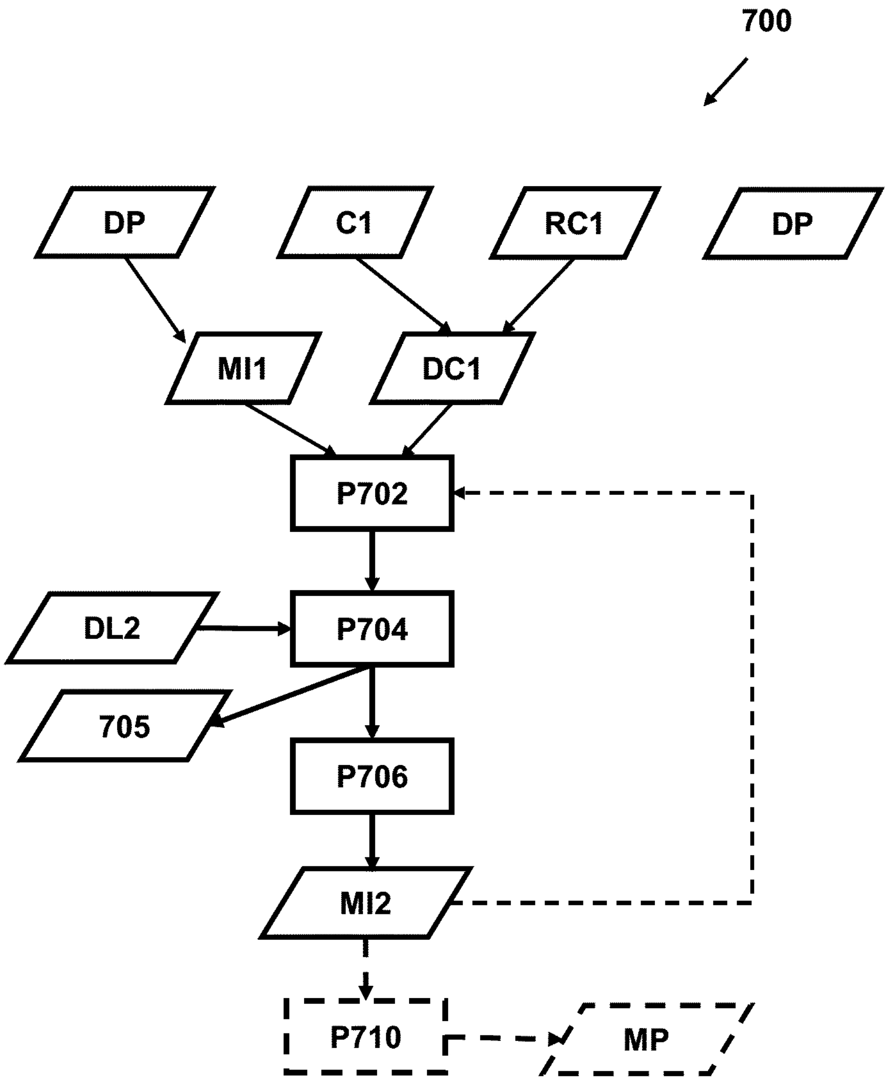
FIG. 7 is a flow chart of a method for generating mask image modification data to be used for determining a mask pattern, according to an embodiment.

FIG. 7 is a flow chart of a method 700 employing a trained model (e.g., trained according to the method 300) for generating an optimized mask image or a mask pattern from a starting mask image, according to an embodiment.

In an embodiment, process P702 includes obtaining (i) a first mask image MI1 associated with a design pattern DP, (ii) a contour C1 based on the first mask image MI1, the contour C1 indicative of a contour of a feature, (iii) a reference contour RC1 based on the design pattern DP; and (iv) a contour difference DC1 between the contour C1 and the reference contour RC.

In an embodiment, a first mask image MI1 may be obtained by executing, a mask generation model using the design pattern DP as input, to generate the first mask image MIL. The first mask image MI1 can be generated in any suitable manner that is well known in the art without departing from the scope of the present disclosure. In an embodiment, the first mask image MI1 may be a continuous transmission mask (CTM) image. In an embodiment, the mask generation model may be a machine learning model, e.g., trained using CTM image generated by an inverse lithography as ground truth. In embodiment, the first mask image MI1 may be a first grey scaled post optical proximity correction (OPC) images.

In an embodiment, the contour C1 may be extracted from the first mask image MIL. The contour C1 indicative of a contour of a mask feature. In an embodiment, obtaining the contour C1 includes executing a patterning process model using the first mask image MI1 as input to generate a simulated image, e.g., an after development resist image or etch image; extracting, using a contour extraction algorithm, a contour from the simulated image; and converting the contour to generate a contour image. In an embodiment, the contour C1 include geometric shape information, which may be extracted using image processing such as an edge detection algorithm. In an embodiment, the contour C1 is a contour associated with an after development process, the after development process being a resist process, or an etch process.

In an embodiment, the reference contour RC1 may be generated using the design pattern DP. In an embodiment, the reference contour RC1 is an ideal contour to be formed on the substrate. In an embodiment, an ideal contour may be generated by simulating a patterning process with ideal process conditions or process with negligible variations in process parameters. For example, ideal conditions may include negligible or correctable optical aberrations, a perfect resist development, negligible dose or focus variations, etc. In an embodiment, the reference contour RC1 is obtained by rasterizing the design pattern DP.

In an embodiment, the contour difference DC1 may be generated by taking a difference between the contour C1 and the reference contour RC1. In an embodiment, the contour difference DC1 may be represented as an image (e.g., see the image 810DI in FIG. 8).

In an embodiment, process P704 includes generating, via the model DL2 using the contour difference DC1 and the first mask image MI1, mask image modification data 705 that is indicative of an amount of modification of the first mask image MIL. In an embodiment, the modification data when added to the mask image causes a performance parameter (e.g., EPE) of the patterning process to be within a desired performance range. For example, EPE of the patterning process is improved compared to existing technology. The model DL2 configured to generate the mask image modification data may be a machine learning model.

The mask image modification data 705 may include values (e.g., intensity values) at locations corresponding to main features or assist features of the mask image MI. In an embodiment, when such values in the mask image modification data 705 are combined with the mask image to generate an updated mask image, portions corresponding to the main features or assist features can change. As such, when the updated mask image is used to extract contours of main features or assist features, such extracted contours will be different (e.g., improved) compared to contours extracted from the inputted mask image.

In an example, the mask image modification data 705 is represented as a grey scaled image. For example, see mask image modification data 810 in FIG. 8. The mask image modification data 705 can be added to the mask image to generate an updated mask image. In the present example, the mask image modification data includes portions with relatively high intensity values at locations corresponding to the main features that can cause a substantial change in shapes of a mask pattern when an updated mask image is used.

In an embodiment, process P706 includes generating, based on the first mask image MI1 and the mask image modification data 705, a second mask image MI2 for determining a mask pattern to be employed in the patterning process. In an embodiment, the second mask image MI2 may be a second grey scaled post optical proximity correction (OPC) images.

In an embodiment, the second mask image MI2 may be further optimized by iterating using the updated mask image and updated difference contour. For example, generating the second mask image MI2 may be an iterative process. Each iteration includes updating a current mask image (e.g., a last updated mask image) with the mask image data; and generating, based on the updated mask image and the mask image modification data 705, the second mask image MI2. In an embodiment, each iteration further includes generating an updated contour difference based on a difference between the updated mask image and the reference contour RC1; and generating, based on the updated mask image and the updated contour difference, the mask image modification data 705.

In an embodiment, the method 700 may further include a process P710 for determining a mask pattern from the second mask image MI2. The present disclosure is not limited to any specific method or process of determining a mask pattern from a mask image. In an embodiment, the process P710 includes extracting, based on the second mask image MI2, mask pattern edges from the second mask image MI2 to generate the mask pattern. In an embodiment, extracting of the mask pattern edges includes processing, via thresholding, the second mask image MI2 to detect edges associated with one or more features for use in the mask pattern; and generating the mask pattern using the edges of the one or more features. In an embodiment, the mask pattern includes a main feature corresponding to the design pattern DP, and one or more assist features located around the main feature. In an embodiment, the extracted mask pattern edges include polygons or curved outlines associated with the main feature and the one or more assist features.

Figure 8:
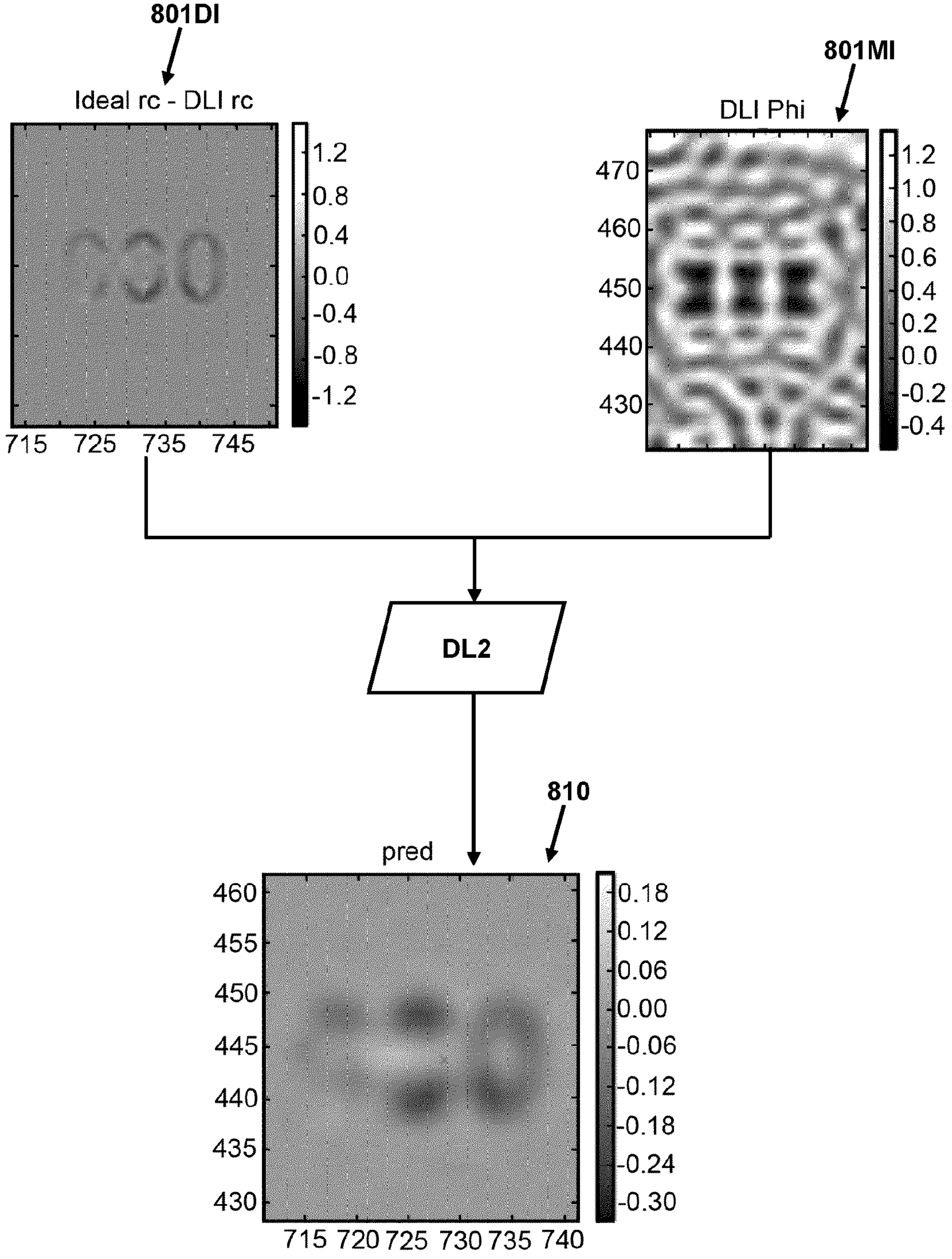
FIG. 8 illustrates example of generating mask image modification data using the model determined according to FIG. 3, according to an embodiment.

FIG. 8 illustrates an example application of a model that generates mask image modification data according to embodiments of the present disclosure. In an embodiment, the model DL2 is determined according to method 300 discussed above. The model DL2 receives a difference contour 801DI and a mask image 801MI as input and generate mask image modification data 810 as output. In the present example, the difference contour 801DI and a mask image 801MI is represented as grey scale pixelated images for illustration purposes.

In an embodiment, the difference contour image 801DI may be generated by taking a difference between a contour extracted from a mask image 801MI and a reference contour. In an embodiment, the reference contour is an ideal contour that can be formed on the substrate. In an embodiment, the ideal contour may be a simulated contour having minimum edge placement error with respect to design pattern. In an embodiment, the ideal contour may be simulated contour obtained by simulating a patterning process assuming ideal process conditions such as negligible aberrations or correctable aberrations, an ideal resist behavior model according to physics based equations, or other processes conditions with negligible parameter variations.

In an embodiment, the mask image 801MI may be a CTM image obtained from a Freeform OPC simulation, or obtained from a machine learning model configured to generate a mask image using, for example, a design pattern as input. The mask image 801MI may be updated using the mask image modification image 810. In an embodiment, the mask image updating may be an iterative process. For example, the mask image 801MI may be updated using the mask image modification data 810 (e.g., as discussed in process P706 of FIG. 7). As such, in a subsequent iteration, an updated mask image (e.g., sum of initial mask image 801MI and the mask image modification data 810) may be used as input to the model DL2. As the updated mask image is used in a subsequent iteration, the difference contour image is updated as well. For example, using the updated mask image, an updated contour image may be extracted, as discussed earlier. Based on the updated contour image and the reference contour image, an updated contour difference image may generated.

In an embodiment, the model DL2 may be used to optimize the mask image by iteratively updating the mask image, as discussed with respect to FIG. 8. For example, in successive iterations, the updated mask image and the updated contour difference image may be used as input to the model DL2 and generate new mask image modification data to further update the mask image. In an embodiment, the optimization of the mask image may be performed for a specified number of iterations. In an embodiment, the mask image may be considered as optimized when subsequent iterations produced minimal changes in a prior mask image.

Figure 9:
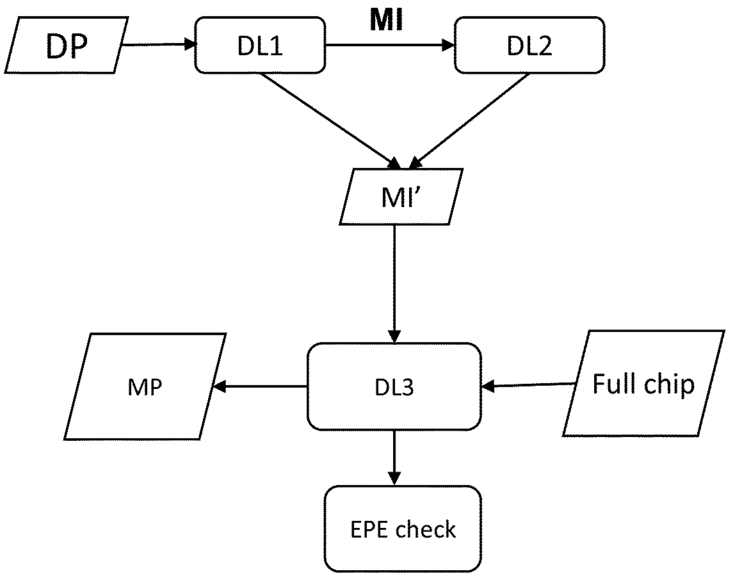
FIG. 9 is a block diagram showing exemplary integration of the model, determined according to FIG. 3, into an existing mask generation process.

FIG. 9 illustrates exemplary integration of the model DL2 into an existing method of determining a mask pattern. In the present example, a design pattern DP may be input to a first machine learning model DL1 (e.g., a trained CNN) to generate a mask image MI. The mask image MI may be input to a second machine learning model (e.g., DL2 trained according to the present disclosure) to generate mask image modification data. In some embodiments, DL1 and DL2 may be implemented as a single integrated model or separate models. In an embodiment, the mask image MI is updated using the mask image modification data to generate an updated mask image MI'. In an embodiment, e.g., discussed with respect to FIGS. 5 and 6, the updating of the mask image MI' may be an iterative process.

The updated mask image MI' can be used to generate a mask pattern. For example, outlines corresponding to main patterns may be extracted from the mask image MI'. In an embodiment, assist features such as sub-resolution assist feature (SRAF) may be extracted using a third machine learning model DL3. The third machine learning model DL3 may be trained according methods e.g., discussed in U.S. patent application No. 62/975,267. The extracted main pattern and the SRAF can be incorporated in to a mask pattern to be employed for a patterning process. In the present example, three different machine learning model DL1, DL2, and DL3 co-operate to generate a mask pattern. In an embodiment, the SRAFs from model DL3 may be combined including in the mask pattern and further the mask pattern may used to determine a performance of the patterning process. In an example, the mask pattern may be used in a patterning process simulation to determine a performance (e.g., EPE) of the patterning process. If the simulated performance is not within a desired performance threshold (e.g., EPE threshold), then the mask pattern may be further modified iteratively using the models DL1, DL2, and DL3 until the simulated EPE is within the desired threshold. In another example, the mask pattern may be manufactured employed to pattern a substrate. The patterned substrate may be inspected to determine an edge placement error (EPE) of printed patterns with respect to the design patterns.

In an example, the models DL1, DL2, and DL3 are fast to enable a full chip simulation. For example, a full chip layout including billions of features or patterns may be used to generate one or more mask patterns MPs corresponding to patterns of the full chip layout. Such full chip layout simulation enables increasing an overall yield of the patterning process.

In an embodiment, a non-transitory computer-readable medium may be configured to determine a model to generate mask image modification data by executing instructions implementing processes of the methods described herein. In an embodiment, a non-transitory computer-readable medium may be configured to generate mask image modification data for a mask image using a model (e.g., DL2) stored in a memory of the medium. In an embodiment, the medium comprises instructions stored therein that, when executed by one or more processors, cause operations (e.g., processes) of the methods described herein.

In an embodiment, a non-transitory computer-readable medium for generating a mask image associated with a patterning process based on mask image modification data generated by a model. The mask image is configured to extract a mask pattern for the patterning process. In an example, the medium comprising instructions stored therein that, when executed by one or more processors, cause operations including generating, via a mask generation model, a first mask image based on a design pattern desired to be formed on a substrate; determining, via simulation of an after development process of the patterning process using the first mask image, a contour on the substrate associated with the after development process; converting, via rasterization operation, the contour to generate a contour image; receiving a reference contour image based on the design pattern; generating a contour difference image based on a difference between the contour image and the reference contour image; generating, via a model using the contour difference image and the first mask image as inputs, mask image modification data that is indicative of an amount of modification of the first mask image for causing a performance parameter of the patterning process to be within a desired performance range; and generating, by combining the first mask image and the mask image modification data, a second mask image configured to allow extraction of a mask pattern for the patterning process.

According to present disclosure, the combination and sub-combinations of disclosed elements constitute separate embodiments. For example, a first combination includes determining a mask image using a mask image modification data generated by a model. A second combination determining a post-OPC pattern by updating a mask image with the mask image modification data. In another combination, a model is trained using noise induced mask image and a contour difference image. In another combination, a lithographic apparatus comprises a mask manufactured using the mask pattern determined as discussed herein. In an embodiment, the updated mask image may be further used in OPC, SMO, etc. Example methods of OPC and SMO are discussed with respect to FIGS. 10-13.

In an embodiment, the methods (e.g., 300 and 700) discussed herein may be provided as a computer program product or a non-transitory computer readable medium having instructions recorded thereon, the instructions when executed by a computer implementing the operation of the methods 300 and 700 discussed above.

Figure 14:
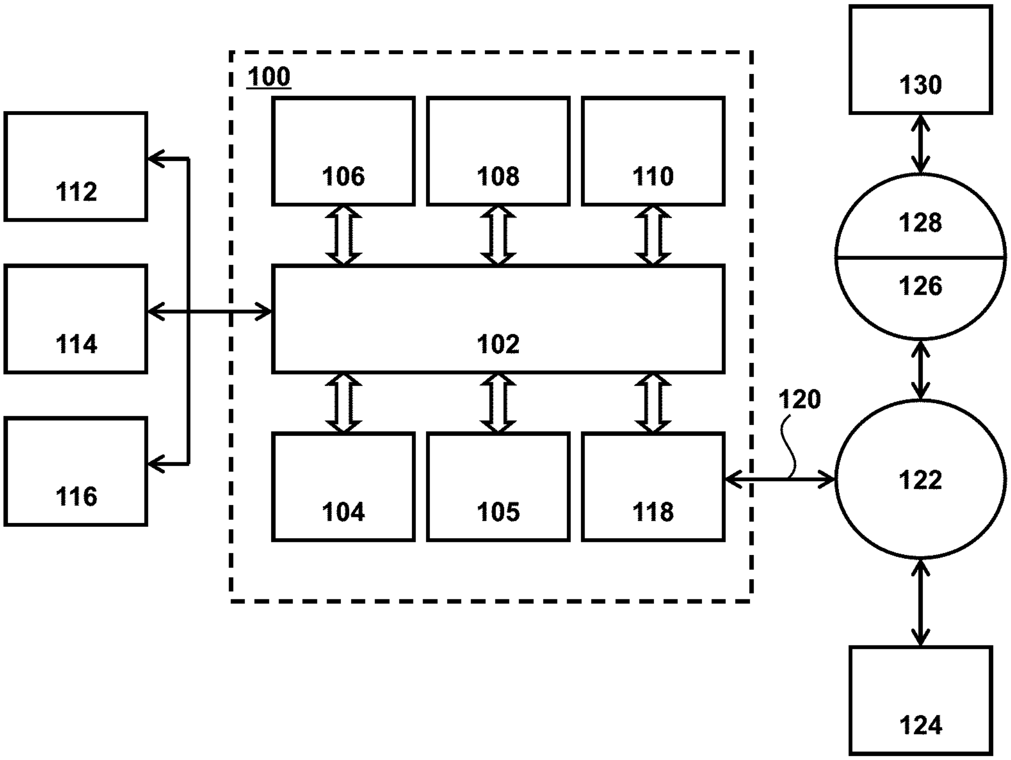
FIG. 14 is a block diagram of an example computer system, according to an embodiment.

For example, an example computer system 100 in FIG. 14 includes a non-transitory computer-readable media (e.g., memory) comprising instructions that, when executed by one or more processors (e.g., 104), cause operations including the processes of the methods described herein.

It is noted that the terms "mask", "reticle", "patterning device" are utilized interchangeably herein. Also, person skilled in the art will recognize that, especially in the context of lithography simulation/optimization, the term "mask"/"patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

In order to ensure that the projected image of the design layout is in accordance with requirements of a given target circuit design, proximity effects need to be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

Application of model-based OPC to a target design involves good process models and considerable computational resources, given the many millions of features typically present in a chip design. However, applying OPC is generally not an "exact science", but an empirical, iterative process that does not always compensate for all possible proximity effect. Therefore, effect of OPC, e.g., design layouts after application of OPC and any other RET, need to be verified by design inspection, i.e. intensive full-chip simulation using calibrated numerical process models, in order to minimize the possibility of design flaws being built into the patterning device pattern. This is driven by the enormous cost of making high-end patterning devices, which run in the multi-million dollar range, as well as by the impact on turn-around time by reworking or repairing actual patterning devices once they have been manufactured.

Both OPC and full-chip RET verification may be based on numerical modeling systems and methods as described, for example in, U.S. patent application Ser. No. 10/815,573 and an article titled "Optimized Hardware and Software For Fast, Full Chip Simulation", by Y. Cao et al., Proc. SPIE, Vol. 5754, 405 (2005).

One RET is related to adjustment of the global bias of the design layout. The global bias is the difference between the patterns in the design layout and the patterns intended to print on the substrate. For example, a circular pattern of 25 nm diameter may be printed on the substrate by a 50 nm diameter pattern in the design layout or by a 20 nm diameter pattern in the design layout but with high dose.

In addition to optimization to design layouts or patterning devices (e.g., OPC), the illumination source can also be optimized, either jointly with patterning device optimization or separately, in an effort to improve the overall lithography fidelity. The terms "illumination source" and "source" are used interchangeably in this document. Since the 1990*s*, many off-axis illumination sources, such as annular, quadrupole, and dipole, have been introduced, and have provided more freedom for OPC design, thereby improving the imaging results, As is known, off-axis illumination is a proven way to resolve fine structures (i.e., target features) contained in the patterning device. However, when compared to a traditional illumination source, an off-axis illumination source usually provides less radiation intensity for the aerial image (AI). Thus, it becomes desirable to attempt to optimize the illumination source to achieve the optimal balance between finer resolution and reduced radiation intensity.

Numerous illumination source optimization approaches can be found, for example, in an article by Rosenbluth et al., titled "Optimum Mask and Source Patterns to Print A Given Shape", Journal of Microlithography, Microfabrication, Microsystems 1(1), pp. 13-20, (2002). The source is partitioned into several regions, each of which corresponds to a certain region of the pupil spectrum. Then, the source distribution is assumed to be uniform in each source region and the brightness of each region is optimized for process window. However, such an assumption that the source distribution is uniform in each source region is not always valid, and as a result the effectiveness of this approach suffers. In another example set forth in an article by Granik, titled "Source Optimization for Image Fidelity and Throughput", Journal of Microlithography, Microfabrication, Microsystems 3(4), pp. 509-522, (2004), several existing source optimization approaches are overviewed and a method based on illuminator pixels is proposed that converts the source optimization problem into a series of non-negative least square optimizations. Though these methods have demonstrated some successes, they typically require multiple complicated iterations to converge. In addition, it may be difficult to determine the appropriate/optimal values for some extra parameters, such as $\gamma$ in Granik's method, which dictates the trade-off between optimizing the source for substrate image fidelity and the smoothness requirement of the source.

For low $k_1$ photolithography, optimization of both the source and patterning device is useful to ensure a viable process window for projection of critical circuit patterns. Some algorithms (e.g. Socha et. al. Proc. SPIE vol. 5853, 2005, p. 180) discretize illumination into independent source points and mask into diffraction orders in the spatial frequency domain, and separately formulate a cost function (which is defined as a function of selected design variables) based on process window metrics such as exposure latitude which could be predicted by optical imaging models from source point intensities and patterning device diffraction orders. The term "design variables" as used herein comprises a set of parameters of a lithographic projection apparatus or a lithographic process, for example, parameters a user of the lithographic projection apparatus can adjust, or image characteristics a user can adjust by adjusting those parameters. It should be appreciated that any characteristics of a lithographic projection process, including those of the source, the patterning device, the projection optics, and/or resist characteristics can be among the design variables in the optimization. The cost function is often a non-linear function of the design variables. Then standard optimization techniques are used to minimize the cost function.

Relatedly, the pressure of ever decreasing design rules have driven semiconductor chipmakers to move deeper into the low $k_1$ lithography era with existing 193 nm ArF lithography. Lithography towards lower $k_1$ puts heavy demands on RET, exposure tools, and the need for litho-friendly design. 1.35 ArF hyper numerical aperture (NA) exposure tools may be used in the future. To help ensure that circuit design can be produced on to the substrate with workable process window, source-patterning device optimization (referred to herein as source-mask optimization or SMO) is becoming a significant RET for 2×nm node.

A source and patterning device (design layout) optimization method and system that allows for simultaneous optimization of the source and patterning device using a cost function without constraints and within a practicable amount of time is described in a commonly assigned International Patent Application No. PCT/US2009/065359, filed on Nov. 20, 2009, and published as WO2010/059954, titled "Fast Freeform Source and Mask Co-Optimization Method", which is hereby incorporated by reference in its entirety.

Another source and mask optimization method and system that involves optimizing the source by adjusting pixels of the source is described in a commonly assigned U.S. patent application Ser. No. 12/813,456, filed on Jun. 10, 2010, and published as U.S. Patent Application Publication No. 2010/0315614, titled "Source-Mask Optimization in Lithographic Apparatus", which is hereby incorporated by reference in its entirety.

In a lithographic projection apparatus, as an example, a cost function is expressed as $$CF(z_1, z_2, \ldots, z_N) = \sum_{p=1}^{P} w_p f_p^2(z_1, z_2, \ldots, z_N) \tag{Eq. 1}$$

wherein $(z_1, z_2, \ldots, z_N)$ are N design variables or values thereof. $f_p(z_1, z_2, \ldots, z_N)$ can be a function of the design variables $(z_1, z_2, \ldots, z_N)$ such as a difference between an actual value and an intended value of a characteristic at an evaluation point for a set of values of the design variables of $(z_1, z_2, \ldots, z_N)$. $w_p$ is a weight constant associated with $f_p(z_1, z_2, \ldots, z_N)$. An evaluation point or pattern more critical than others can be assigned a higher $w_p$ value. Patterns and/or evaluation points with larger number of occurrences may be assigned a higher $w_p$ value, too. Examples of the evaluation points can be any physical point or pattern on the substrate, any point on a virtual design layout, or resist image, or aerial image, or a combination thereof. $f_p(z_1, z_2, \ldots, z_N)$ can also be a function of one or more stochastic effects such as the LWR, which are functions of the design variables $(z_1, z_2, \ldots, z_N)$. The cost function may represent any suitable characteristics of the lithographic projection apparatus or the substrate, for instance, failure rate of a feature, focus, CD, image shift, image distortion, image rotation, stochastic effects, throughput, CDU, or a combination thereof. CDU is local CD variation (e.g., three times of the standard deviation of the local CD distribution). CDU may be interchangeably referred to as LCDU. In one embodiment, the cost function represents (i.e., is a function of) CDU, throughput, and the stochastic effects. In one embodiment, the cost function represents (i.e., is a function of) EPE, throughput, and the stochastic effects. In one embodiment, the design variables $(z_1, z_2, \ldots, z_N)$ comprise dose, global bias of the patterning device, shape of illumination from the source, or a combination thereof. Since it is the resist image that often dictates the circuit pattern on a substrate, the cost function often includes functions that represent some characteristics of the resist image. For example, $f_p(z_1, z_2, \ldots, z_N)$ of such an evaluation point can be simply a distance between a point in the resist image to an intended position of that point (i.e., edge placement error $EPE_p(z_1, z_2, \ldots, z_N)$). The design variables can be any adjustable parameters such as adjustable parameters of the source, the patterning device, the projection optics, dose, focus, etc. The projection optics may include components collectively called as "wavefront manipulator" that can be used to adjust shapes of a wavefront and intensity distribution and/or phase shift of the irradiation beam. The projection optics preferably can adjust a wavefront and intensity distribution at any location along an optical path of the lithographic projection apparatus, such as before the patterning device, near a pupil plane, near an image plane, near a focal plane. The projection optics can be used to correct or compensate for certain distortions of the wavefront and intensity distribution caused by, for example, the source, the patterning device, temperature variation in the lithographic projection apparatus, thermal expansion of components of the lithographic projection apparatus. Adjusting the wavefront and intensity distribution can change values of the evaluation points and the cost function. Such changes can be simulated from a model or actually measured. Of course, $CF(z_1, z_2, \ldots, z_N)$ is not limited the form in Eq. 1. $CF(z_1, z_2, \ldots, z_N)$ can be in any other suitable form.

It should be noted that the normal weighted root mean square (RMS) of $f_p(z_1, z_2, \ldots, z_N)$ is defined as $$\sqrt{\frac{1}{P}\sum\nolimits_{p=1}^{P} w_p f_p^2(z_1, z_2, \ldots, z_N)},$$

therefore, minimizing the weighted RMS of $f_p(z_1, z_2, \ldots, z_N)$ is equivalent to minimizing the cost function $$CF(z_1, z_2, \ldots, z_N) = \sum\nolimits_{p=1}^{P} w_p f_p^2(z_1, z_2, \ldots, z_N),$$

defined in Eq. 1. Thus the weighted RMS of $f_p(z_1, z_2, \ldots, z_N)$ and Eq. 1 may be utilized interchangeably for notational simplicity herein.

Further, if considering maximizing the PW (Process Window), one can consider the same physical location from different PW conditions as different evaluation points in the cost function in (Eq. 1). For example, if considering N PW conditions, then one can categorize the evaluation points according to their PW conditions and write the cost functions as:

$$CF(z_1, z_2, \ldots, z_N) = \sum_{p=1}^{P} w_p f_p^2(z_1, z_2, \ldots, z_N) = \sum_{u=1}^{U} \sum_{p_u=1}^{P_u} w_{p_u} f_{p_u}^2(z_1, z_2, \ldots, z) \tag{Eq. 1'}$$

Where $f_{p_u}(z_1, z_2, \ldots, z_N)$ is the value of $f_p(z_1, z_2, \ldots, z_N)$ under the u-th PW condition u=1, . . . , U. When $f_p(z_1, z_2, \ldots, z_N)$ is the EPE, then minimizing the above cost function is equivalent to minimizing the edge shift under various PW conditions, thus this leads to maximizing the PW. In particular, if the PW also consists of different mask bias, then minimizing the above cost function also includes the minimization of MEEF (Mask Error Enhancement Factor), which is defined as the ratio between the substrate EPE and the induced mask edge bias.

The design variables may have constraints, which can be expressed as $(z_1, z_2, \ldots, z) \in Z$, where Z is a set of possible values of the design variables. One possible constraint on the design variables may be imposed by a desired throughput of the lithographic projection apparatus. The desired throughput may limit the dose and thus has implications for the stochastic effects (e.g., imposing a lower bound on the stochastic effects). Higher throughput generally leads to lower dose, shorter longer exposure time and greater stochastic effects. Consideration of substrate throughput and minimization of the stochastic effects may constrain the possible values of the design variables because the stochastic effects are function of the design variables. Without such a constraint imposed by the desired throughput, the optimization may yield a set of values of the design variables that are unrealistic. For example, if the dose is among the design variables, without such a constraint, the optimization may yield a dose value that makes the throughput economically impossible. However, the usefulness of constraints should not be interpreted as a necessity. The throughput may be affected by the failure rate based adjustment to parameters of the patterning process. It is desirable to have lower failure rate of the feature while maintaining a high throughput. Throughput may also be affected by the resist chemistry. Slower resist (e.g., a resist that requires higher amount of light to be properly exposed) leads to lower throughput. Thus, based on the optimization process involving failure rate of a feature due to resist chemistry or fluctuations, and dose requirements for higher throughput, appropriate parameters of the patterning process may be determined.

The optimization process therefore is to find a set of values of the design variables, under the constraints $(z_1, z_2, \ldots, z) \in Z$, that minimize the cost function, i.e., to find $$(\tilde{z}_1, \tilde{z}_2, \ldots, \tilde{z}_N) = \underset{(z_1, z_2, \ldots, z_N) \in Z}{\arg\min}\ CF(z_1, z_2, \ldots, z_N) = \underset{(z_1, z_2, \ldots, z_N) \in Z}{\arg\min} \sum_{p=1}^{P} w_p f_p^2(z_1, z_2, \ldots, z_N) \quad \text{(Eq. 2)}$$

Figure 10:
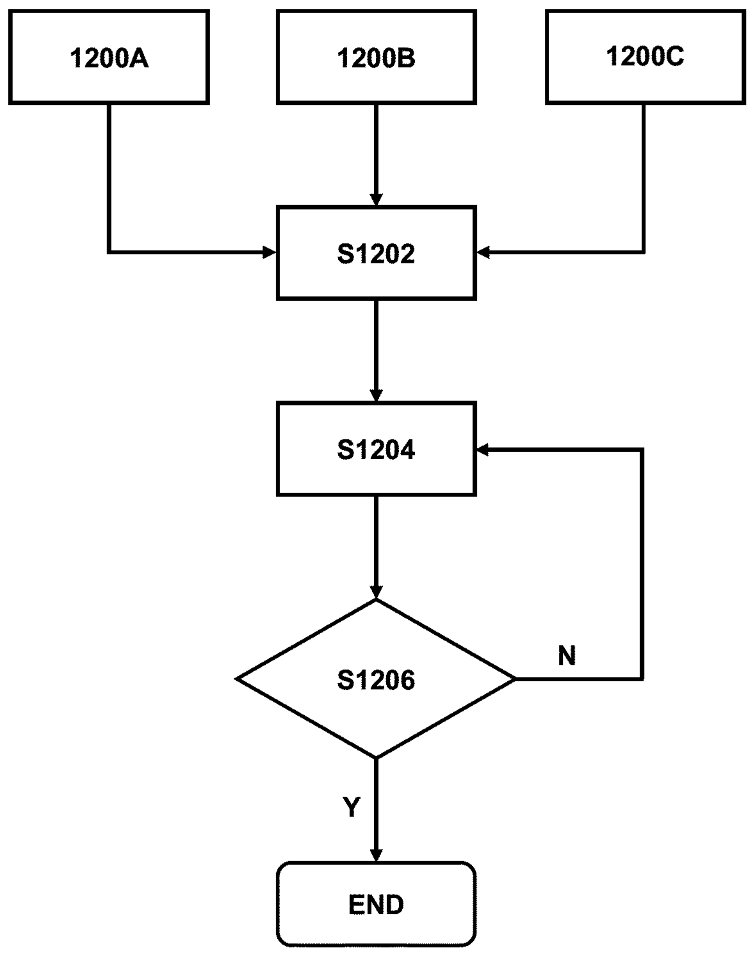
FIG. 10 is a flow diagram illustrating aspects of an example methodology of joint optimization, according to an embodiment.

A general method of optimizing the lithography projection apparatus, according to an embodiment, is illustrated in FIG. 10. This method comprises a step S1202 of defining a multi-variable cost function of a plurality of design variables. The design variables may comprise any suitable combination selected from characteristics of the illumination source (1200A) (e.g., pupil fill ratio, namely percentage of radiation of the source that passes through a pupil or aperture), characteristics of the projection optics (1200B) and characteristics of the design layout (1200C). For example, the design variables may include characteristics of the illumination source (1200A) and characteristics of the design layout (1200C) (e.g., global bias) but not characteristics of the projection optics (1200B), which leads to an SMO. Alternatively, the design variables may include characteristics of the illumination source (1200A), characteristics of the projection optics (1200B) and characteristics of the design layout (1200C), which leads to a source-mask-lens optimization (SMLO). In step S1204, the design variables are simultaneously adjusted so that the cost function is moved towards convergence. In step S1206, it is determined whether a predefined termination condition is satisfied. The predetermined termination condition may include various possibilities, i.e. the cost function may be minimized or maximized, as required by the numerical technique used, the value of the cost function has been equal to a threshold value or has crossed the threshold value, the value of the cost function has reached within a preset error limit, or a preset number of iteration is reached. If either of the conditions in step S1206 is satisfied, the method ends. If none of the conditions in step S1206 is satisfied, the step S1204 and S1206 are iteratively repeated until a desired result is obtained. The optimization does not necessarily lead to a single set of values for the design variables because there may be physical restraints caused by factors such as the failure rates, the pupil fill factor, the resist chemistry, the throughput, etc. The optimization may provide multiple sets of values for the design variables and associated performance characteristics (e.g., the throughput) and allows a user of the lithographic apparatus to pick one or more sets.

In a lithographic projection apparatus, the source, patterning device and projection optics can be optimized alternatively (referred to as Alternative Optimization) or optimized simultaneously (referred to as Simultaneous Optimization). The terms "simultaneous", "simultaneously", "joint" and "jointly" as used herein mean that the design variables of the characteristics of the source, patterning device, projection optics and/or any other design variables, are allowed to change at the same time. The term "alternative" and "alternatively" as used herein mean that not all of the design variables are allowed to change at the same time.

Figure 11:
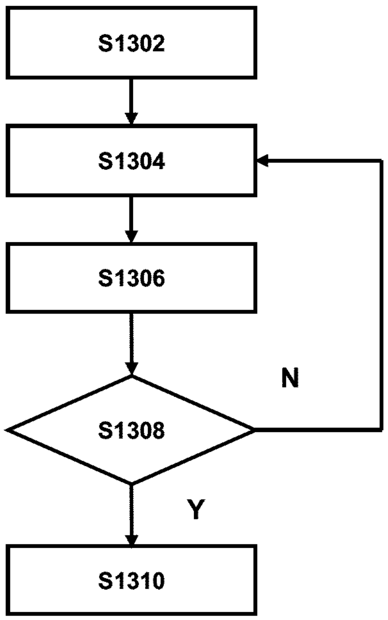
FIG. 11 shows an embodiment of another optimization method, according to an embodiment.

In FIG. 11, the optimization of all the design variables is executed simultaneously. Such flow may be called the simultaneous flow or co-optimization flow. Alternatively, the optimization of all the design variables is executed alternatively, as illustrated in FIG. 11. In this flow, in each step, some design variables are fixed while the other design variables are optimized to minimize the cost function; then in the next step, a different set of variables are fixed while the others are optimized to minimize the cost function. These steps are executed alternatively until convergence or certain terminating conditions are met.

As shown in the non-limiting example flowchart of FIG. 11, first, a design layout (step S1302) is obtained, then a step of source optimization is executed in step S1304, where all the design variables of the illumination source are optimized (SO) to minimize the cost function while all the other design variables are fixed. Then in the next step S1306, a mask optimization (MO) is performed, where all the design variables of the patterning device are optimized to minimize the cost function while all the other design variables are fixed. These two steps are executed alternatively, until certain terminating conditions are met in step S1308. Various termination conditions can be used, such as, the value of the cost function becomes equal to a threshold value, the value of the cost function crosses the threshold value, the value of the cost function reaches within a preset error limit, or a preset number of iteration is reached, etc. Note that SO-MO-Alternative-Optimization is used as an example for the alternative flow. The alternative flow can take many different forms, such as SO-LO-MO-Alternative-Optimization, where SO, LO (Lens Optimization) is executed, and MO alternatively and iteratively; or first SMO can be executed once, then execute LO and MO alternatively and iteratively; and so on. Finally, the output of the optimization result is obtained in step S1310, and the process stops.

The pattern selection algorithm, as discussed before, may be integrated with the simultaneous or alternative optimization. For example, when an alternative optimization is adopted, first a full-chip SO can be performed, the 'hot spots' and/or 'warm spots' are identified, then an MO is performed. In view of the present disclosure numerous permutations and combinations of sub-optimizations are possible in order to achieve the desired optimization results.

Figure 12A:
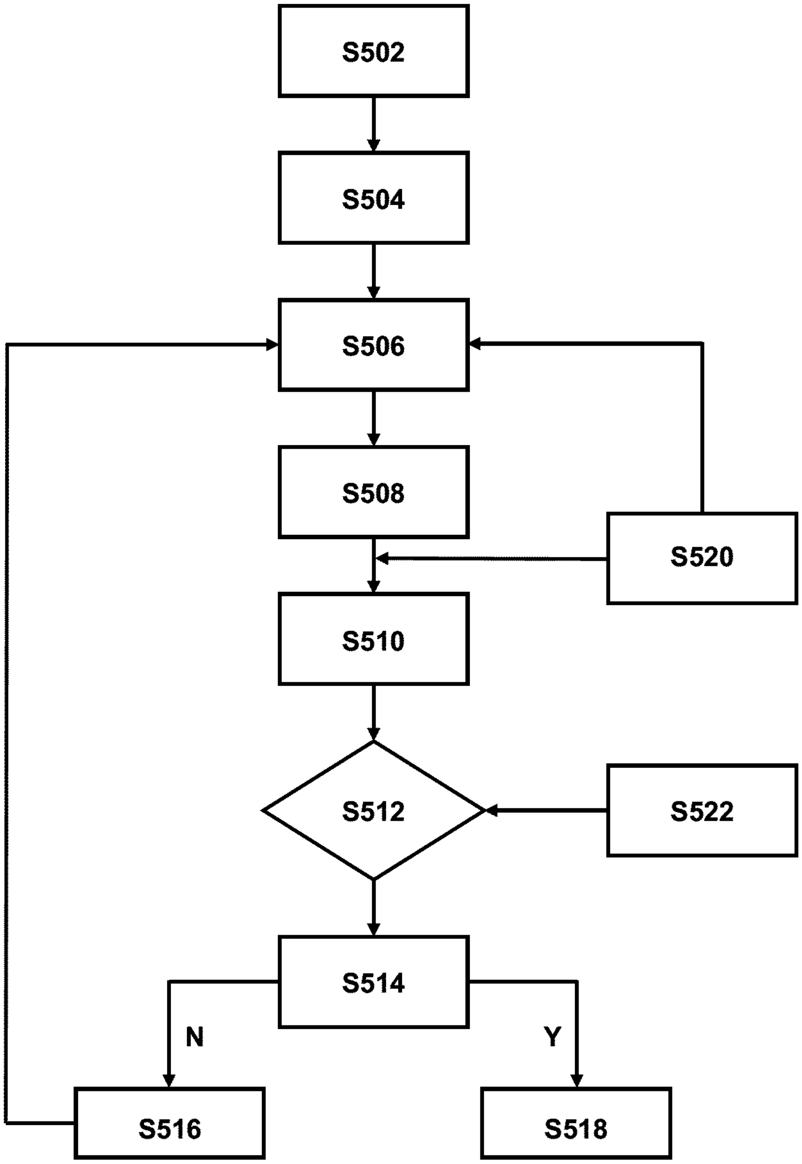
FIGS. 12A, 12B and 13 show example flowcharts of various optimization processes, according to an embodiment.

FIG. 12A shows one exemplary method of optimization, where a cost function is minimized. In step S502, initial values of design variables are obtained, including their tuning ranges, if any. In step S504, the multi-variable cost function is set up. In step S506, the cost function is expanded within a small enough neighborhood around the starting point value of the design variables for the first iterative step (i=0). In step S508, standard multi-variable optimization techniques are applied to minimize the cost function. Note that the optimization problem can apply constraints, such as tuning ranges, during the optimization process in S508 or at a later stage in the optimization process. Step S520 indicates that each iteration is done for the given test patterns (also known as "gauges") for the identified evaluation points that have been selected to optimize the lithographic process. In step S510, a lithographic response is predicted. In step S512, the result of step S510 is compared with a desired or ideal lithographic response value obtained in step S522. If the termination condition is satisfied in step S514, i.e. the optimization generates a lithographic response value sufficiently close to the desired value, and then the final value of the design variables is outputted in step S518. The output step may also include outputting other functions using the final values of the design variables, such as outputting a wavefront aberration-adjusted map at the pupil plane (or other planes), an optimized source map, and optimized design layout etc. If the termination condition is not satisfied, then in step S516, the values of the design variables is updated with the result of the i-th iteration, and the process goes back to step S506. The process of FIG. 12A is elaborated in details below.

In an exemplary optimization process, no relationship between the design variables $(z_1, z_2, \ldots, z_N)$ and $f_p(z_1, z_2, \ldots, z_N)$ is assumed or approximated, except that $f_p(z_1, z_2, \ldots, z_N)$ is sufficiently smooth (e.g. first order derivatives $$\frac{\partial f_p(z_1, z_2, \ldots, z_N)}{\partial z_n},$$

(n=1, 2, . . . N) exist), which is generally valid in a lithographic projection apparatus. An algorithm, such as the Gauss-Newton algorithm, the Levenberg-Marquardt algorithm, the gradient descent algorithm, simulated annealing, the genetic algorithm, can be applied to find $(\tilde{z}_1, \tilde{z}_2, \ldots, \tilde{z}_N)$.

Here, the Gauss-Newton algorithm is used as an example. The Gauss-Newton algorithm is an iterative method applicable to a general non-linear multi-variable optimization problem. In the i-th iteration wherein the design variables $(z_1, z_2, \ldots, z_N)$ take values of $(z_{1i}, z_{2i}, \ldots, z_{Ni})$, the Gauss-Newton algorithm linearizes $f_p(z_1, z_2, \ldots, z_N)$ in the vicinity of $(z_{1i}, z_{2i}, \ldots, z_{Ni})$, and then calculates values $(z_{1(i+1)}, z_{2(i+1)}, \ldots, z_{N(i+1)})$ in the vicinity of $(z_{1i}, z_{2i}, \ldots, z_{Ni})$ that give a minimum of $CF(z_1, z_2, \ldots, z_N)$. The design variables $(z_1, z_2, \ldots, z_N)$ take the values of $(z_{1(i+1)}, z_{2(i+1)}, \ldots, z_{N(i+1)})$ in the (i+1)-th iteration. This iteration continues until convergence (i.e. $CF(z_1, z_2, \ldots, z_N)$ does not reduce any further) or a preset number of iterations is reached.

Specifically, in the i-th iteration, in the vicinity of $(z_{1i}, z_{2i}, \ldots, z_{Ni})$, $$f_p(z_1, z_2, \ldots, z_N) \approx f_p(z_{1i}, z_{2i}, \ldots, z_{Ni}) + \sum_{n=1}^{N} \frac{\partial f_p(z_1, z_2, \ldots, z_N)}{\partial z_n}\bigg|_{z_1=z_{1i}, z_2=z_{2i}, \ldots, z_N=z_{Ni}} (z_n - z_{ni}) \quad \text{(Eq. 3)}$$

Under the approximation of Eq. 3, the cost function becomes:

$$CF(z_1, z_2, \ldots, z_N) = \sum_{p=1}^{P} w_p f_p^2(z_1, z_2, \ldots, z_N) = \quad \text{(Eq. 4)}$$

-continued $$\sum_{p=1}^{P} w_p \left( f_p(z_{1i}, z_{2i}, \ldots, z_{Ni}) + \sum_{n=1}^{N} \frac{\partial f_p(z_1, z_2, \ldots, z_N)}{\partial z_n}\bigg|_{z_1=z_{1i}, z_2=z_{2i}, \ldots, z_N=z_{Ni}} (z_n - z_{ni}) \right)^2$$

which is a quadratic function of the design variables $(z_1, z_2, \ldots, z_N)$. Every term is constant except the design variables $(z_1, z_2, \ldots, z_N)$.

If the design variables $(z_1, z_2, \ldots, z_N)$ are not under any constraints, $(z_{1(i+1)}, z_{2(i+1)}, \ldots, z_{N(i+1)})$ can be derived by solving by N linear equations:

$$\frac{\partial CF(z_1, z_2, \ldots, z_N)}{\partial z_n} = 0,$$

wherein n=1, 2, . . . N.

If the design variables $(z_1, z_2, \ldots, z_N)$ are under the constraints in the form of J inequalities (e.g. tuning ranges of $$(z_1, z_2, \ldots, z_N)) \sum_{n=1}^{N} A_{nj} z_n \le B_j, \text{ for } j = 1, 2, \ldots J;$$

and K equalities (e.g. interdependence between the design variables)

$$\sum_{n=1}^{N} C_{nk} z_n = D_k, \text{ for } k = 1, 2, \ldots K;$$

the optimization process becomes a classic quadratic programming problem, wherein $A_{nj}$, $B_j$, $C_{nk}$, $D_k$ are constants. Additional constraints can be imposed for each iteration. For example, a "damping factor" $\Delta_D$ can be introduced to limit the difference between $(z_{1(i+1)}, z_{2(i+1)}, \ldots, z_{N(i+1)})$ and $(z_{1i}, z_{2i}, \ldots, z_{Ni})$, so that the approximation of Eq. 3 holds. Such constraints can be expressed as $Z_{ni}-\Delta_D \le Z_n \le Z_{ni}+\Delta_D$. $(z_{1(i+1)}, z_{2(i+1)}, \ldots, z_{N(i+1)})$ can be derived using, for example, methods described in Numerical Optimization ($2^{nd}$ ed.) by Jorge Nocedal and Stephen J. Wright (Berlin New York: Vandenberghe. Cambridge University Press).

Instead of minimizing the RMS of $f_p(z_1, z_2, \ldots, z_N)$, the optimization process can minimize magnitude of the largest deviation (the worst defect) among the evaluation points to their intended values. In this approach, the cost function can alternatively be expressed as $$CF(z_1, z_2, \ldots, z_N) = \max_{1 \le p \le P} \frac{f_p(z_1, z_2, \ldots, z_N)}{CL_p} \quad \text{(Eq. 5)}$$

wherein $CL_p$ is the maximum allowed value for $f_p(z_1, z_2, \ldots, z_N)$. This cost function represents the worst defect among the evaluation points. Optimization using this cost function minimizes magnitude of the worst defect. An iterative greedy algorithm can be used for this optimization.

The cost function of Eq. 5 can be approximated as:

$$CF(z_1, z_2, \ldots, z_N) = \sum_{p=1}^{P} \left( \frac{f_p(z_1, z_2, \ldots, z_N)}{CL_p} \right)^q \quad \text{(Eq. 6)}$$

wherein q is an even positive integer such as at least 4, preferably at least 10. Eq. 6 mimics the behavior of Eq. 5, while allowing the optimization to be executed analytically and accelerated by using methods such as the deepest descent method, the conjugate gradient method, etc.

Minimizing the worst defect size can also be combined with linearizing of $f_p(z_1, z_2, \ldots, z_N)$. Specifically, $f_p(z_1, z_2, \ldots, z_N)$ is approximated as in Eq. 3. Then the constraints on worst defect size are written as inequalities $E_{Lp} \le f_p(z_1, z_2, \ldots, z_N)$ $E_{Up}$, wherein $E_{Lp}$ and $E_{Up}$ are two constants specifying the minimum and maximum allowed deviation for the $f_p(z_1, z_2, \ldots, z_N)$. Plugging Eq. 3 in, these constraints are transformed to, for p=1, . . . P, $$\sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}.} z_n \le E_{Up} \sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}.} z_{ni} - f_p(z_{1i}, z_{2i}, \ldots, z_{Ni}) \quad \text{(Eq. 6')}$$

and $$-\sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}.} z_n \le E_{Up} - \sum_{n=1}^{N} \frac{\partial f_p(z_1, z_2, \ldots, z_N)}{\partial z_n} \bigg|_{z_1=z_{1i}, z_2=z_{2i}, \ldots, z_N=z_{Ni}.} z_{ni} - f_p(z_{1i}, z_{2i}, \ldots, z_{Ni}) \quad \text{(Eq. 6'')}$$

Since Eq. 3 is generally valid only in the vicinity of $(z_{1i}, z_{2i}, \ldots, z_{Ni})$, in case the desired constraints $E_{Lp} \le f_p(z_1, z_2, \ldots, z_N) \le E_{Up}$ cannot be achieved in such vicinity, which can be determined by any conflict among the inequalities, the constants $E_{Lp}$ and $E_{Up}$ can be relaxed until the constraints are achievable. This optimization process minimizes the worst defect size in the vicinity of $(z_{1i}, z_{2i}, \ldots, z_{Ni})$. Then each step reduces the worst defect size gradually, and each step is executed iteratively until certain terminating conditions are met. This will lead to optimal reduction of the worst defect size.

Another way to minimize the worst defect is to adjust the weight $w_p$ in each iteration. For example, after the i-th iteration, if the r-th evaluation point is the worst defect, $w_r$ can be increased in the (i+1)-th iteration so that the reduction of that evaluation point's defect size is given higher priority.

In addition, the cost functions in Eq. 4 and Eq. 5 can be modified by introducing a Lagrange multiplier to achieve compromise between the optimization on RMS of the defect size and the optimization on the worst defect size, i.e., $$CF(z_1, z_2, \ldots, z_N) = (1-\lambda)\sum_{p=1}^{P} w_p f_p^2(z_1, z_2, \ldots, z_N) + \lambda \max_{1 \le p \le P} \frac{f_p(z_1, z_2, \ldots, z_N)}{CL_p} \quad \text{(Eq. 6''')}$$

where λ is a preset constant that specifies the trade-off between the optimization on RMS of the defect size and the optimization on the worst defect size. In particular, if 2=0, then this becomes Eq. 4 and the RMS of the defect size is only minimized; while if λ=1, then this becomes Eq. 5 and the worst defect size is only minimized; if 0<λ<1, then both are taken into consideration in the optimization. Such optimization can be solved using multiple methods. For example, the weighting in each iteration may be adjusted, similar to the one described previously. Alternatively, similar to minimizing the worst defect size from inequalities, the inequalities of Eq. 6' and 6" can be viewed as constraints of the design variables during solution of the quadratic programming problem. Then, the bounds on the worst defect size can be relaxed incrementally or increase the weight for the worst defect size incrementally, compute the cost function value for every achievable worst defect size, and choose the design variable values that minimize the total cost function as the initial point for the next step. By doing this iteratively, the minimization of this new cost function can be achieved.

Optimizing a lithographic projection apparatus can expand the process window. A larger process window provides more flexibility in process design and chip design. The process window can be defined as a set of focus and dose values for which the resist image are within a certain limit of the design target of the resist image. Note that all the methods discussed here may also be extended to a generalized process window definition that can be established by different or additional base parameters in addition to exposure dose and defocus. These may include, but are not limited to, optical settings such as NA, sigma, aberrations, polarization, or optical constants of the resist layer. For example, as described earlier, if the PW also consists of different mask bias, then the optimization includes the minimization of MEEF (Mask Error Enhancement Factor), which is defined as the ratio between the substrate EPE and the induced mask edge bias. The process window defined on focus and dose values only serve as an example in this disclosure. A method of maximizing the process window, according to an embodiment, is described below.

In a first step, starting from a known condition $(f_0, \varepsilon_0)$ in the process window, wherein $f_0$ is a nominal focus and $\varepsilon_0$ is a nominal dose, minimizing one of the cost functions below in the vicinity $(f_0 \pm \Delta_f, \varepsilon_0, =\Delta\varepsilon)$:

$$CF(z_1, z_2, \ldots, z_N, f_0, \varepsilon_0) = \max_{(f,\varepsilon)=(f_0\pm\Delta_f, \varepsilon_0\pm\Delta\varepsilon)} \max_p |f_p(z_1, z_2, \ldots, z_N, f, \varepsilon)| \quad \text{(Eq. 7)}$$

or $$CF(z_1, z_2, \ldots, z_N, f_0, \varepsilon_0) = \sum_{(f,\varepsilon)=(f_0\pm\Delta_f, \varepsilon_0\pm\Delta\varepsilon)} \sum_p w_p f_p^2(z_1, z_2, \ldots, z_N, f, \varepsilon) \quad \text{(Eq. 7')}$$

or $$CF(z_1, z_2, \ldots, z_N, f_0, \varepsilon_0) = (1-\lambda) \sum_{(f,\varepsilon)=(f_0\pm\Delta_f, \varepsilon_0\pm\Delta\varepsilon)} \sum_p w_p f_p^2(z_1, z_2, \ldots, z_N, f, \varepsilon) + \lambda \max_{(f,\varepsilon)=(f_0\pm\Delta_f, \varepsilon_0\pm\Delta\varepsilon)} \max_p |f_p(z_1, z_2, \ldots, z_N, f, \varepsilon)| \quad \text{(Eq. 7'')}$$

If the nominal focus $f_0$ and nominal dose so are allowed to shift, they can be optimized jointly with the design variables $(z_1, z_2, \ldots, z_N)$. In the next step, $(f_0 \pm \Delta_f, \varepsilon_0 \pm \Delta\varepsilon)$ is accepted as part of the process window, if a set of values of $(z_1, z_2, \ldots, z_N, E)$ can be found such that the cost function is within a preset limit.

Alternatively, if the focus and dose are not allowed to shift, the design variables $(z_1, z_2, \ldots, z_N)$ are optimized with the focus and dose fixed at the nominal focus $f_0$ and nominal dose $\varepsilon_0$. In an alternative embodiment, $(f_0 \pm \Delta_f, \varepsilon_0 \pm \Delta\varepsilon)$ is accepted as part of the process window, if a set of values of $(z_1, z_2, \ldots, z_N)$ can be found such that the cost function is within a preset limit.

The methods described earlier in this disclosure can be used to minimize the respective cost functions of Eqs. 7, 7', or 7". If the design variables are characteristics of the projection optics, such as the Zernike coefficients, then minimizing the cost functions of Eqs. 7, 7', or 7" leads to process window maximization based on projection optics optimization, i.e., LO. If the design variables are characteristics of the source and patterning device in addition to those of the projection optics, then minimizing the cost function of Eqs. 7, 7', or 7" leads to process window maximizing based on SMLO, as illustrated in FIG. 11. If the design variables are characteristics of the source and patterning device and, then minimizing the cost functions of Eqs. 7, 7', or 7" leads to process window maximization based on SMO. The cost functions of Eqs. 7, 7', or 7" can also include at least one $f_p(z_1, z_2, \ldots, z_N)$ such as that in Eq. 7 or Eq. 8, that is a function of one or more stochastic effects such as the LWR or local CD variation of 2D features, and throughput.

Figure 13:
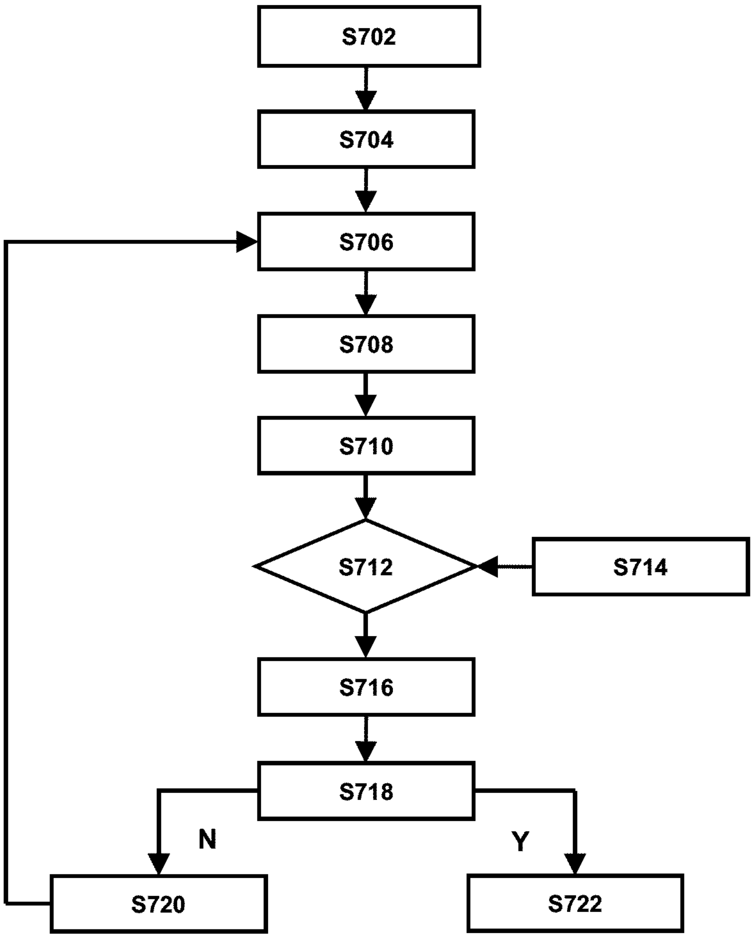

FIG. 13 shows one specific example of how a simultaneous SMLO process can use a Gauss Newton Algorithm for optimization. In step S702, starting values of design variables are identified. Tuning ranges for each variable may also be identified. In step S704, the cost function is defined using the design variables. In step S706 cost function is expanded around the starting values for all evaluation points in the design layout. In optional step S710, a full-chip simulation is executed to cover all critical patterns in a full-chip design layout. Desired lithographic response metric (such as CD or EPE) is obtained in step S714, and compared with predicted values of those quantities in step S712. In step S716, a process window is determined. Steps S718, S720, and S722 are similar to corresponding steps S514, S516 and S518, as described with respect to FIG. 12A. As mentioned before, the final output may be a wavefront aberration map in the pupil plane, optimized to produce the desired imaging performance. The final output may also be an optimized source map and/or an optimized design layout.

Figure 12B:
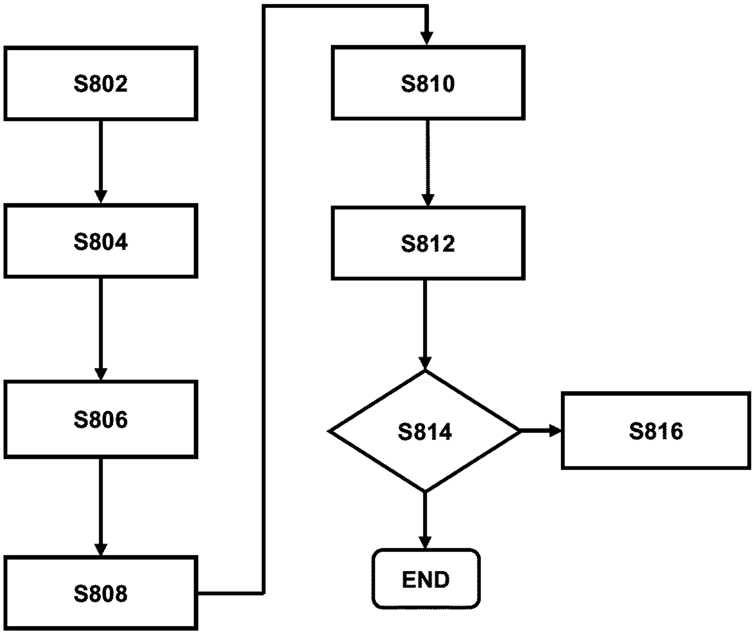

FIG. 12B shows an exemplary method to optimize the cost function where the design variables $(z_1, z_2, \ldots, z_N)$ include design variables that may only assume discrete values.

The method starts by defining the pixel groups of the illumination source and the patterning device tiles of the patterning device (step S802). Generally, a pixel group or a patterning device tile may also be referred to as a division of a lithographic process component. In one exemplary approach, the illumination source is divided into 117 pixel groups, and 94 patterning device tiles are defined for the patterning device, substantially as described above, resulting in a total of 211 divisions.

In step S804, a lithographic model is selected as the basis for photolithographic simulation. Photolithographic simulations produce results that are used in calculations of photolithographic metrics, or responses. A particular photolithographic metric is defined to be the performance metric that is to be optimized (step S806). In step S808, the initial (pre-optimization) conditions for the illumination source and the patterning device are set up. Initial conditions include initial states for the pixel groups of the illumination source and the patterning device tiles of the patterning device such that references may be made to an initial illumination shape and an initial patterning device pattern. Initial conditions may also include mask bias, NA, and focus ramp range. Although steps S802, S804, S806, and S808 are depicted as sequential steps, it will be appreciated that in other embodiments of the invention, these steps may be performed in other sequences.

In step S810, the pixel groups and patterning device tiles are ranked. Pixel groups and patterning device tiles may be interleaved in the ranking. Various ways of ranking may be employed, including: sequentially (e.g., from pixel group 1 to pixel group 117 and from patterning device tile 1 to patterning device tile 94), randomly, according to the physical locations of the pixel groups and patterning device tiles (e.g., ranking pixel groups closer to the center of the illumination source higher), and according to how an alteration of the pixel group or patterning device tile affects the performance metric.

Once the pixel groups and patterning device tiles are ranked, the illumination source and patterning device are adjusted to improve the performance metric (step S812). In step S812, each of the pixel groups and patterning device tiles are analyzed, in order of ranking, to determine whether an alteration of the pixel group or patterning device tile will result in an improved performance metric. If it is determined that the performance metric will be improved, then the pixel group or patterning device tile is accordingly altered, and the resulting improved performance metric and modified illumination shape or modified patterning device pattern form the baseline for comparison for subsequent analyses of lower-ranked pixel groups and patterning device tiles. In other words, alterations that improve the performance metric are retained. As alterations to the states of pixel groups and patterning device tiles are made and retained, the initial illumination shape and initial patterning device pattern changes accordingly, so that a modified illumination shape and a modified patterning device pattern result from the optimization process in step S812.

In other approaches, patterning device polygon shape adjustments and pairwise polling of pixel groups and/or patterning device tiles are also performed within the optimization process of S812.

In an alternative embodiment the interleaved simultaneous optimization procedure may include to alter a pixel group of the illumination source and if an improvement of the performance metric is found, the dose is stepped up and down to look for further improvement. In a further alternative embodiment the stepping up and down of the dose or intensity may be replaced by a bias change of the patterning device pattern to look for further improvement in the simultaneous optimization procedure.

In step S814, a determination is made as to whether the performance metric has converged. The performance metric may be considered to have converged, for example, if little or no improvement to the performance metric has been witnessed in the last several iterations of steps S810 and S812. If the performance metric has not converged, then the steps of S810 and S812 are repeated in the next iteration, where the modified illumination shape and modified patterning device from the current iteration are used as the initial illumination shape and initial patterning device for the next iteration (step S816).

The optimization methods described above may be used to increase the throughput of the lithographic projection apparatus. For example, the cost function may include an $f_p(z_1, z_2, \ldots, z_N)$ that is a function of the exposure time. Optimization of such a cost function is preferably constrained or influenced by a measure of the stochastic effects or other metrics. Specifically, a computer-implemented method for increasing a throughput of a lithographic process may include optimizing a cost function that is a function of one or more stochastic effects of the lithographic process and a function of an exposure time of the substrate, in order to minimize the exposure time.

In one embodiment, the cost function includes at least one $f_p(z_1, z_2, \ldots, z_N)$ that is a function of one or more stochastic effects. The stochastic effects may include the failure of a feature, measurement data (e.g., SEPE), LWR or local CD variation of 2D features. In one embodiment, the stochastic effects include stochastic variations of characteristics of a resist image. For example, such stochastic variations may include failure rate of a feature, line edge roughness (LER), line width roughness (LWR) and critical dimension uniformity (CDU). Including stochastic variations in the cost function allows finding values of design variables that minimize the stochastic variations, thereby reducing risk of defects due to stochastic effects.

FIG. 14 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 15:
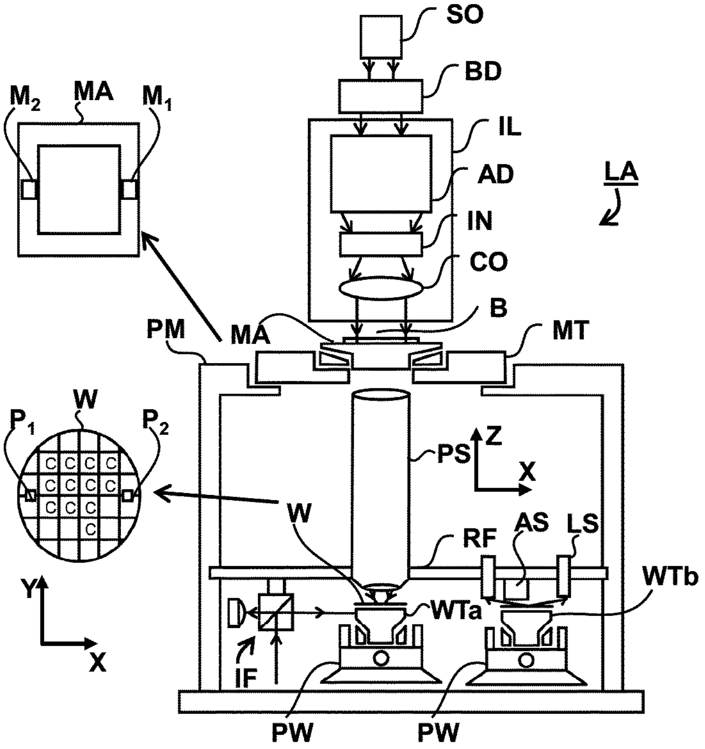
FIG. 15 is a schematic diagram of a lithographic projection apparatus, according to an embodiment.

FIG. 15 schematically depicts an exemplary lithographic projection apparatus whose illumination source could be optimized utilizing the methods described herein. The apparatus comprises:

- an illumination system IL, to condition a beam B of radiation. In this particular case, the illumination system also comprises a radiation source SO;
- a first object table (e.g., mask table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning device as an alternative to the use of a classic mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 15 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 15. However, in the case of a wafer stepper (as opposed to a step-and-scan tool) the patterning device table MT may just be connected to a short stroke actuator, or may be fixed.

The depicted tool can be used in two different modes:

- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
- In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 16:
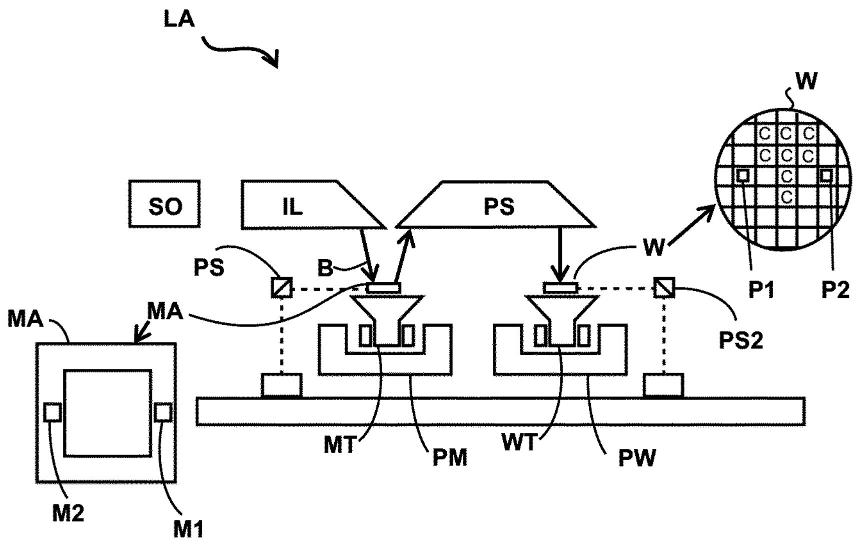
FIG. 16 is a schematic diagram of another lithographic projection apparatus, according to an embodiment.

FIG. 16 schematically depicts another exemplary lithographic projection apparatus 1000 whose illumination source could be optimized utilizing the methods described herein.

The lithographic projection apparatus 1000 includes:

- a source collector module SO
- an illumination system (illuminator) IL configured to condition a radiation beam B (e.g. EUV radiation).
- a support structure (e.g. a mask table) MT constructed to support a patterning device (e.g. a mask or a reticle) MA and connected to a first positioner PM configured to accurately position the patterning device;
- a substrate table (e.g. a wafer table) WT constructed to hold a substrate (e.g. a resist coated wafer) W and connected to a second positioner PW configured to accurately position the substrate; and
- a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the mask may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 16, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 16, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.
2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.
3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 17:
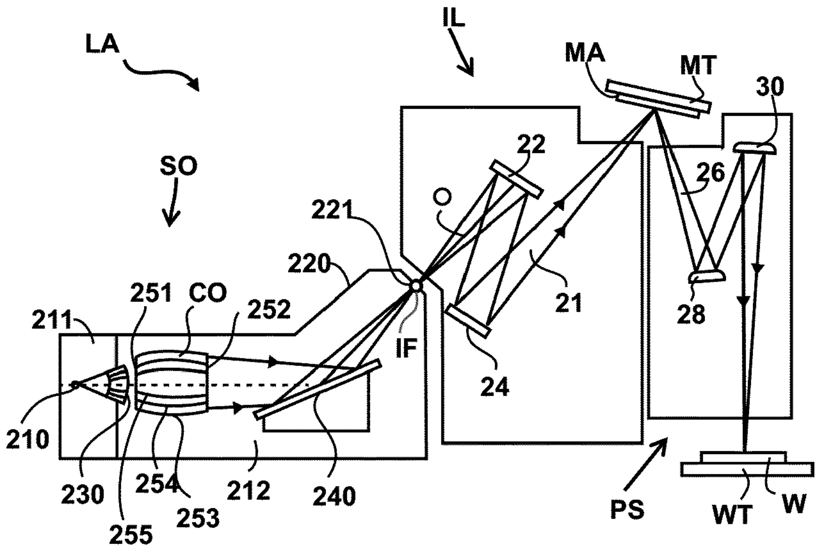
FIG. 17 is a more detailed view of the apparatus in FIG. 16, according to an embodiment.

FIG. 17 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 17.

Collector optic CO, as illustrated in FIG. 17, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 18:
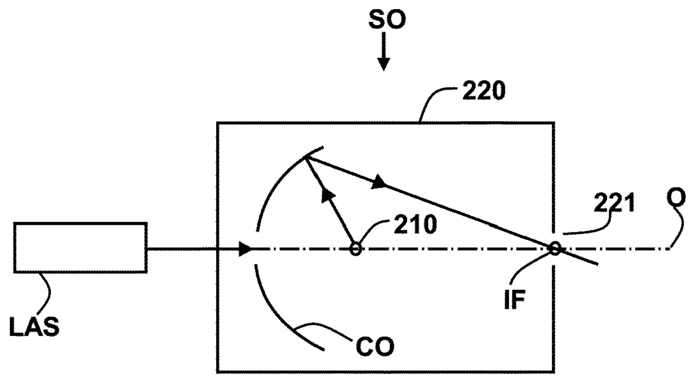
FIG. 18 is a more detailed view of the source collector module SO of the apparatus of FIGS. 16 and 17, according to an embodiment.

Alternatively, the source collector module SO may be part of an LPP radiation system as shown in FIG. 18. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-nm by using a synchrotron or by hitting a material (either solid or a plasma) with high energy electrons in order to produce photons within this range.

Embodiments of the present disclosure can be further described by the following clauses.

1. A non-transitory computer-readable medium for generating a mask image associated with a patterning process based on mask image modification data generated by a model, the mask image configured to extract a mask pattern for the patterning process, the medium comprising instructions stored therein that, when executed by one or more processors, cause operations comprising:
   generating, via a mask generation model, a first mask image based on a design pattern desired to be formed on a substrate;
   determining, via simulation of an after development process of the patterning process using the first mask image, a contour on the substrate associated with the after development process;
   converting, by rasterization operation, the contour to generate a contour image;
   receiving a reference contour image based on the design pattern;
   generating a contour difference image based on a difference between the contour image and the reference contour image;
   generating, via a model using the contour difference image and the first mask image as inputs, mask image modification data that is indicative of an amount of modification of the first mask image for causing a performance parameter of the patterning process to be within a desired performance range; and
   generating, by combining the first mask image and the mask image modification data, a second mask image configured to allow extraction of a mask pattern for the patterning process.
2. A non-transitory computer-readable medium for generating data for a mask pattern associated with a patterning process comprising instructions stored therein that, when executed by one or more processors, cause operations comprising:
   obtaining (i) a first mask image associated with a design pattern, (ii) a contour based on the first mask image, the contour indicative of a contour of a feature, (iii) a reference contour based on the design pattern; and (iv) a contour difference between the contour and the reference contour;
   generating, via a model using the contour difference and the first mask image, mask image modification data that is indicative of an amount of modification of the first mask image for causing a performance parameter of the patterning process to be within a desired performance range; and
   generating, based on the first mask image and the mask image modification data, a second mask image for determining a mask pattern to be employed in the patterning process.
3. The medium of clause 2, wherein obtaining the first mask image comprises:
   executing, a mask generation model using the design pattern as input, to generate the first mask image, the first mask image being a continuous transmission mask (CTM) image.
4. The medium of clause 3, wherein the mask generation model is a machine learning model trained using CTM image generated by an inverse lithography as ground truth.
5. The medium of clause 2, wherein generating the second mask image is an iterative process, each iteration comprising:
   updating a current mask image with the mask image data; and
   generating, based on the updated mask image and the mask image modification data, the second mask image.
6. The medium of clause 5, wherein each iteration further comprising:
   generating an updated contour difference based on a difference between the updated mask image and the reference contour; and generating, based on the updated mask image and the updated contour difference, the mask image modification data.

7. The medium of any of clauses 2-6, wherein obtaining the contour comprises:
executing a patterning process model using the first mask image as input to generate a simulated image;
extracting, using a contour extraction algorithm, a contour from the simulated image; and converting the contour to generate a contour image.

8. The medium of any of preceding clauses, wherein the reference contour is an ideal contour to be formed on the substrate.

9. The medium of any of preceding clauses, wherein the reference contour is obtained by rasterizing the design pattern.

10. The medium of any of preceding clauses, wherein the first mask image and the second mask image are grey scaled post optical proximity correction (OPC) images.

11. The medium of any of preceding clauses, wherein the model configured to generate the mask image modification data is a machine learning model.

12. The medium of any of preceding clauses, the operations further comprising:
extracting, based on the second mask image, mask pattern edges from the second mask image to generate the mask pattern.

13. The medium of clause 12, wherein extracting of the mask pattern edges comprises:
processing, via thresholding, the second mask image to detect edges associated with one or more features for use in the mask pattern; and
generating the mask pattern using the edges of the one or more features.

14. The medium of clause 13, wherein the mask pattern comprises: a main feature corresponding to the design pattern, and one or more assist features located around the main feature.

15. The medium of clause 14, wherein the extracted mask pattern edges include polygons or curved outlines associated with the main feature and the one or more assist features.

16. The medium of any of preceding clauses, wherein the first image, the second image, the contour, the reference contour, and the mask image modification data are gray-scale pixelated images.

17. The medium of any of preceding clauses, wherein the contour is a contour associated with an after development process, the after development process being a resist process, or an etch process.

18. The medium of any of preceding clauses, wherein the model is trained by:
obtaining (i) a noise induced first mask image based on the first mask image and noise, (ii) a second reference contour based on the noise induced first mask image, and (iii) a second contour difference based on a difference between the contour and the second reference contour; and
determining, based on the second contour difference and the first mask image, a model configured to generate mask image modification data.

19. The medium of clause 18, wherein obtaining the second reference contour comprises: generating and adding a random noise image to the first mask image.

20. The medium of clause 19, wherein obtaining the second reference contour comprises: extracting, using a contour extraction algorithm, a second contour from the noise induced first mask image; and converting the second contour to generate the second reference contour image.

21. The medium of any of preceding clauses, wherein determining the model is an iterative process, each iteration comprises:
executing, using the second contour difference and the first mask image as input, a model having initial model parameter values to generate an initial mask image modification data;
comparing the mask image modification data with the noise; and
adjusting the initial model parameter values to cause the mask image modification data to be within a specified matching threshold of the noise.

22. A non-transitory computer-readable medium for determining a model configured to generate mask image modification data associated with a patterning process, the medium comprising instructions stored therein that, when executed by one or more processors, cause operations comprising:
obtaining (i) a first mask image based on a design pattern, (ii) a contour based on the first mask image, the contour indicative of a contour of a feature, (iii) a noise induced first mask image based on the first mask image and noise, (iv) a reference contour based on the noise induced first mask image, and (v) a contour difference based on a difference between the contour and the reference contour; and
determining, based on the contour difference and the first mask image, a model configured to generate mask image modification data.

23. The medium of clause 22, wherein obtaining the contour comprises:
executing a patterning process model using the first mask image as input to generate a simulated image;
extracting, using a contour extraction algorithm, a contour from the simulated image; and
converting the contour to generate the contour image.

24. The medium of any of preceding clauses, wherein obtaining the reference contour comprises: generating and adding a random noise image to the first mask image.

25. The medium of any of preceding clauses, wherein obtaining the reference contour comprises:
extracting, using a contour extraction algorithm, a contour from the noise induced first mask image; and
converting the contour to generate the reference contour image.

26. The medium of any of preceding clauses, wherein determining the model is an iterative process, each iteration comprises:
executing, using the contour difference and the first mask image or an updated mask image as input, a model having initial model parameter values to generate an initial mask image modification data;
comparing the mask image modification data with the noise; and
adjusting the initial model parameter values to cause the mask image modification data to be within a specified matching threshold of the noise.

27. The medium of any of preceding clauses, wherein the first mask image and the second mask image are grey scaled post optical proximity correction (OPC) images.

28. The medium of any of preceding clauses, wherein the model configured to generate the mask image modification data is a machine learning model.

29. The medium of any of preceding clauses, wherein the first image, the second image, the contour, the reference contour, and the mask image modification data are gray-scale pixelated images.
30. The medium of any of preceding clauses, wherein the contour is a contour associated with an after development process, the after development process being a resist process, or an etch process.
31. The medium of any of preceding clauses, further comprising:
obtaining a mask image and a reference contour based on a design pattern;
executing the model using the mask image and the contour difference to generate mask image modification data; and
updating the mask image by combining the mask image modification data with the mask image.
32. The medium of clause 31, wherein updating the mask image is an iterative process comprising:
(i) updating the contour difference based on the updated mask image;
(ii) executing the model using the updated mask image and the updated contour difference to generate mask image modification data;
(iii) combining the mask image modification data with the updated mask image;
(iv) determining based the updated mask image whether a performance parameter is within a specified performance threshold; and
(v) responsive to the performance parameter not satisfying the performance threshold, performing steps (i)-(iv).
33. A method for generating data for a mask pattern associated with a patterning process, the method comprising:
obtaining (i) a first mask image associated with a design pattern, (ii) a contour based on the first mask image, the contour indicative of a contour of a feature, (iii) a reference contour based on the design pattern; and (iv) a contour difference between the contour and the reference contour;
generating, via a model using the contour difference and the first mask image, mask image modification data that is indicative of an amount of modification of the first mask image for causing a performance parameter of the patterning process to be within a desired performance range; and
generating, based on the first mask image and the mask image modification data, a second mask image for determining a mask pattern to be employed in the patterning process.
34. The method of clause 33, wherein obtaining the first mask image comprises:
executing, a mask generation model using the design pattern as input, to generate the first mask image, the first mask image being a continuous transmission mask (CTM) image.
35. The method of clause 34, wherein the mask generation model is a machine learning model trained using CTM image generated by an inverse lithography as ground truth.
36. The method of clause 35, wherein generating the second mask image is an iterative process, each iteration comprising:
updating a current mask image with the mask image data; and
generating, based on the updated mask image and the mask image modification data, the second mask image.
37. The method of clause 36, wherein each iteration further comprising:
generating an updated contour difference based on a difference between the updated mask image and the reference contour; and
generating, based on the updated mask image and the updated contour difference, the mask image modification data.
38. The method of any of clauses 33-37, wherein obtaining the contour comprises:
executing a patterning process model using the first mask image as input to generate a simulated image;
extracting, using a contour extraction algorithm, a contour from the simulated image; and
converting the contour to generate a contour image.
39. The method of any of preceding clauses, wherein the reference contour is an ideal contour to be formed on the substrate.
40. The method of any of preceding clauses, wherein the reference contour is obtained by rasterizing the design pattern.
41. The method of any of preceding clauses, wherein the first mask image and the second mask image are grey scaled post optical proximity correction (OPC) images.
42. The method of any of preceding clauses, wherein the model configured to generate the mask image modification data is a machine learning model.
43. The method of any of preceding clauses, the operations further comprising:
extracting, based on the second mask image, mask pattern edges from the second mask image to generate the mask pattern.
44. The method of clause 43, wherein extracting of the mask pattern edges comprises:
processing, via thresholding, the second mask image to detect edges associated with one or more features for use in the mask pattern; and
generating the mask pattern using the edges of the one or more features.
45. The method of clause 44, wherein the mask pattern comprises: a main feature corresponding to the design pattern, and one or more assist features located around the main feature.
46. The method of clause 45, wherein the extracted mask pattern edges include polygons or curved outlines associated with the main feature and the one or more assist features.
47. The method of any of preceding clauses, wherein the first image, the second image, the contour, the reference contour, and the mask image modification data are gray-scale pixelated images.
48. The method of any of preceding clauses, wherein the contour is a contour associated with an after development process, the after development process being a resist process, or an etch process.
49. The method of any of preceding clauses, wherein the model is trained by:
obtaining (i) a noise induced first mask image based on the first mask image and noise, (ii) a second reference contour based on the noise induced first mask image, and (iii) a second contour difference based on a difference between the contour and the second reference contour; and determining, based on the second contour difference and the first mask image, a model configured to generate mask image modification data.

50. The method of clause 49, wherein obtaining the second reference contour comprises: generating and adding a random noise image to the first mask image.

51. The method of clause 50, wherein obtaining the second reference contour comprises:

extracting, using a contour extraction algorithm, a second contour from the noise induced first mask image; and converting the second contour to generate the second reference contour image.

52. The method of any of preceding clauses, wherein determining the model is an iterative process, each iteration comprises:

executing, using the second contour difference and the first mask image as input, a model having initial model parameter values to generate an initial mask image modification data;

comparing the mask image modification data with the noise; and adjusting the initial model parameter values to cause the mask image modification data to be within a specified matching threshold of the noise.

53. A method for determining a model configured to generate mask image modification data associated with a patterning process, the method comprising:

obtaining (i) a first mask image based on a design pattern, (ii) a contour based on the first mask image, the contour indicative of a contour of a feature, (iii) a noise induced first mask image based on the first mask image and noise, (iv) a reference contour based on the noise induced first mask image, and (v) a contour difference based on a difference between the contour and the reference contour; and determining, based on the contour difference and the first mask image, a model configured to generate mask image modification data.

54. The method of clause 53, wherein obtaining the contour comprises:

executing a patterning process model using the first mask image as input to generate a simulated image;

extracting, using a contour extraction algorithm, a contour from the simulated image; and converting the contour to generate the contour image.

55. The method of any of preceding clauses, wherein obtaining the reference contour comprises: generating and adding a random noise image to the first mask image.

56. The method of any of preceding clauses, wherein obtaining the reference contour comprises:

extracting, using a contour extraction algorithm, a contour from the noise induced first mask image; and converting the contour to generate the reference contour image.

57. The method of any of preceding clauses, wherein determining the model is an iterative process, each iteration comprises:

executing, using the contour difference and the first mask image as input, a model having initial model parameter values to generate an initial mask image modification data;

comparing the mask image modification data with the noise; and adjusting the initial model parameter values to cause the mask image modification data to be within a specified matching threshold of the noise.

58. The method of any of preceding clauses, wherein the first mask image and the second mask image are grey scaled post optical proximity correction (OPC) images.

59. The method of any of preceding clauses, wherein the model configured to generate the mask image modification data is a machine learning model.

60. The method of any of preceding clauses, wherein the first image, the second image, the contour, the reference contour, and the mask image modification data are gray-scale pixelated images.

61. The method of any of preceding clauses, wherein the contour is a contour associated with an after development process, the after development process being a resist process, or an etch process.

62. The method of any of preceding clauses, further comprising:

obtaining a mask image and a reference contour based on a design pattern;

executing the model using the mask image and the contour difference to generate mask image modification data; and updating the mask image by combining the mask image modification data with the mask image.

63. The method of clause 62, wherein updating the mask image is an iterative process comprising:

(i) updating the contour difference based on the updated mask image;

(ii) executing the model using the updated mask image and the updated contour difference to generate mask image modification data;

(iii) combining the mask image modification data with the updated mask image;

(iv) determining based the updated mask image whether a performance parameter is within a specified performance threshold; and (v) responsive to the performance parameter not satisfying the performance threshold, performing steps (i)-(iv).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

The invention claimed is:

1. A non-transitory computer-readable medium comprising instructions stored that, when executed by one or more processors, are configured to cause the one or more processors to at least:

obtain (i) a first mask image associated with a design pattern, (ii) a contour based on the first mask image, the contour indicative of a contour of a feature, (iii) a reference contour based on the design pattern; and (iv) a contour difference between the contour and the reference contour;

generate, via a model using the contour difference and the first mask image, mask image modification data that is indicative of an amount of modification of the first mask image; and generate, based on the first mask image and the mask image modification data, a second mask image for determining a mask pattern associated with a patterning process.

2. The medium of claim 1, wherein the instructions configured to cause the one or more processors to obtain the first mask image are further configured to cause the one or more processors to execute a mask generation model, using the design pattern as input, to generate the first mask image, the first mask image being a continuous transmission mask (CTM) image.

3. The medium of claim 2, wherein the mask generation model is a machine learning model trained using a CTM image generated by an inverse lithography as ground truth.

4. The medium of claim 3, wherein the instructions configured to cause the one or more processors to generate the second mask image are further configured to cause the one or more processors to:

update a current mask image with the mask image modification data; and generate, based on the updated mask image and the mask image modification data, the second mask image.

5. The medium of claim 4, wherein the instructions are further configured to cause the one or more processors to:

generate an updated contour difference based on a difference between the updated mask image and the reference contour; and generate, based on the updated mask image and the updated contour difference, the mask image modification data.

6. The medium of claim 1, wherein the instructions configured to cause the one or more processors to obtain the contour based on the first mask image are further configured to cause the one or more processors to:

execute a patterning process model using the first mask image as input to generate a simulated image;

extract, using a contour extraction algorithm, a contour from the simulated image; and convert the contour to generate a contour image, and wherein the reference contour is obtained by rasterization of the design pattern.

7. The medium of claim 1, wherein the first mask image and the second mask image are grey scaled post optical proximity correction (OPC) images.

8. The medium of claim 1, wherein the model configured to generate the mask image modification data is a machine learning model.

9. The medium of claim 1, wherein the instructions are further configured to cause the one or more processors to extract, based on the second mask image, mask pattern edges from the second mask image to generate the mask pattern, wherein the mask pattern comprises: a main feature corresponding to the design pattern, and one or more assist features located around the main feature, and wherein the extracted mask pattern edges include polygons or curved outlines associated with the main feature and the one or more assist features.

10. The medium of claim 1, wherein the first image, the second image, the contour, the reference contour, and the mask image modification data are gray-scale pixelated images.

11. The medium of claim 1, wherein the contour based on the first mask image is a resist contour, an etch contour, a mask image contour, or an aerial image contour.

12. The medium of claim 1, wherein the model is or was trained by:

obtaining of (i) a noise induced first mask image based on the first mask image and noise, (ii) a second reference contour based on the noise induced first mask image, and (iii) a second contour difference based on a difference between the contour based on the first mask image and the second reference contour; and determination, based on the second contour difference and the first mask image, of a model configured to generate mask image modification data.

13. The medium of claim 12, wherein the obtaining of the second reference contour comprises generation and addition of a random noise image to the first mask image.

14. The medium of claim 12, wherein the obtaining of the second reference contour comprises:

extraction, using a contour extraction algorithm, of a second contour from the noise induced first mask image; and conversion of the second contour to generate a second reference contour image.

15. The medium of claim 12, wherein the instructions are further configured to cause the one or more processors to:

execute, using the second contour difference and the first mask image as input, a model having initial model parameter values to generate mask image modification data;

compare the mask image modification data with the noise; and adjust one or more of the initial model parameter values to cause the mask image modification data to be within a specified matching threshold of the noise.

16. A non-transitory computer-readable medium comprising instructions stored therein that, when executed by one or more processors, are configured to cause the one or more processors to at least:

obtain (i) a first mask image based on a design pattern, (ii) a contour based on the first mask image, the contour indicative of a contour of a feature, (iii) a noise induced first mask image based on the first mask image and noise, (iv) a reference contour based on the noise induced first mask image, and (v) a contour difference based on a difference between the contour and the reference contour; and determine, based on the contour difference and the first mask image, a model configured to generate mask image modification data associated with a patterning process.

17. The medium of claim 16, wherein the instructions configured to cause the one or more processors to obtain the first mask image are further configured to cause the one or more processors to execute a mask generation model, using the design pattern as input, to generate the first mask image, the first mask image being a continuous transmission mask (CTM) image.

18. The medium of claim 17, wherein the mask generation model is a machine learning model trained using one or more CTM images generated by an inverse lithography as ground truth.

19. The medium of claim 18, wherein the first mask image is a continuous transmission mask (CTM) image.

20. A non-transitory computer-readable medium comprising instructions stored therein that, when executed by one or more processors, are configured to cause the one or more processors to at least:

generate, via a mask generation model, a first mask image based on a design pattern desired to be formed on a substrate using a patterning process;

determine, via simulation of an after development process of the patterning process using the first mask image, a contour on the substrate associated with the after development process;

convert, by a rasterization operation, the contour to generate a contour image;

receive a reference contour image based on the design pattern;

generate a contour difference image based on a difference between the contour image and the reference contour image;

generate, via a model using the contour difference image and the first mask image as inputs, mask image modification data that is indicative of an amount of modification of the first mask image for causing a performance parameter of the patterning process to be within a desired performance range; and generate, by combination of the first mask image and the mask image modification data, a second mask image configured to allow extraction of a mask pattern for the patterning process.

* * * * *